(12) United States Patent
Lavis et al.

(10) Patent No.: US 12,528,944 B2
(45) Date of Patent: Jan. 20, 2026

(54) LIVE-CELL FLUORESCENT MITOCHONDRIAL STAINS

(71) Applicant: HOWARD HUGHES MEDICAL INSTITUTE, Chevy Chase, MD (US)

(72) Inventors: Luke D. Lavis, Ashburn, VA (US); Sambashiva Banala, Ashburn, VA (US); Ariana N. Tkachuk, Ashburn, VA (US); Timothy A. Brown, Leesburg, VA (US)

(73) Assignee: HOWARD HUGHES MEDICAL INSTITUTE, Chevy Chase, MD (US)

( * ) Notice: Subject to any disclaimer, the term of this patent is extended or adjusted under 35 U.S.C. 154(b) by 389 days.

(21) Appl. No.: 18/189,835

(22) Filed: Mar. 24, 2023

(65) Prior Publication Data
US 2023/0312931 A1 Oct. 5, 2023

Related U.S. Application Data

(60) Provisional application No. 63/326,546, filed on Apr. 1, 2022.

(51) Int. Cl.
*C09B 57/02* (2006.01)
*G01N 21/64* (2006.01)

(52) U.S. Cl.
CPC ......... *C09B 57/02* (2013.01); *G01N 21/6428* (2013.01); *G01N 21/6456* (2013.01); *G01N 2021/6439* (2013.01)

(58) Field of Classification Search
CPC ....... C09B 57/02; C09B 57/002; C09B 57/00; G01N 21/6428; G01N 21/6456; G01N 2021/6439
See application file for complete search history.

(56) References Cited

FOREIGN PATENT DOCUMENTS

WO WO-2009046010 A2 * 4/2009 ........... C07D 413/06

OTHER PUBLICATIONS

Banala, S., A. Tkachuk, R. Patel, p. Kumar, T. Brown and L. Lavis, "2,7-Diaminobenzopyrylium Dyes Are Live-Cell Mitochondrial Stains", ACS Bio Med Chem Au (2022), 2: pp. 307-312. (Year: 2022).*
Johnson, L. V., et al. Localization of mitochondria in living cells with rhodamine 123. Proc. Natl. Acad. Sci. U. S. A. 1980, 77, 990-994.
Scaduto, Jr., R. C., et al. Measurement of Mitochondrial Membrane Potential Using Fluorescent Rhodamine Derivatives. Biophys. J. 1999, 76, 469-477.
Huang, S.-T., et al. The synthesis and optical characterization of novel iminocoumarin derivatives. Dyes Pigm. 2010, 86, 6-14.
Liepouri, F., et al. Iminocoumarin-based low affinity fluorescent Ca2+ indicators excited with visible light. Cell Calcium 2001, 30, 331-335.
Kirpicheok, M. A., et al. Synthesis and spectral-luminescent properties of 2,7-diaminobenzopyrylium tetrafluoroborates. Khim. Geterotsikl. Soedin. 1989, 6, 755-766.
Grimm, J. B., et al. A general method to improve fluorophores for live-cell and single-molecule microscopy. Nat. Methods 2015, 12, 244-250.
Kuznetsova, N., et al. The photochemistry of coumarins. Russ. Chem. Rev. 1992, 61, 683-696.

* cited by examiner

*Primary Examiner* — Kamal A Saeed
*Assistant Examiner* — Sagar Patel
(74) *Attorney, Agent, or Firm* — Stites & Harbison, PLLC; Mandy Wilson Decker

(57) ABSTRACT

Fluorescent stains are described, which enable imaging of cellular structures without the need for genetic manipulation. Unique diaminobenzopyrylium dyes are disclosed, together with their use as live-cell mitochondrial stains.

3 Claims, 18 Drawing Sheets

| scaffold | X | dye | $\lambda_{abs}$ (nm) | $\varepsilon$ (M$^{-1}$cm$^{-1}$) | $\lambda_{em}$ (nm) | $\Phi_f$ | $t_b$ | $N_p$ |
|---|---|---|---|---|---|---|---|---|
| (7-diethylamino-4-methylcoumarin scaffold) | =O | 6 | 383 | 23,100 | 467 | 0.06 | 58.1 | 1310 |
| | =N⁺Et₂ | 8 | 428 | 42,600 | 493 | 0.16 | 85.6 | 18500 |
| (7-azetidinyl-4-methylcoumarin scaffold) | =O | 10 | 354 | 15,000 | 467 | 0.96 | 10.3 | 1490 |
| | =N⁺(azetidine) | 11 | 402 | 28,400 | 501 | 0.79 | 19.3 | 7940 |
| | =O | 12 | 393 | 20,100 | 488 | 0.80 | 1.81 | 550 |
| (julolidine-fused coumarin scaffold) | =N⁺Et₂ | 13 | 445 | 37,200 | 513 | 0.75 | 9.74 | 9120 |
| | =N⁺(azetidine) | 14 | 445 | 39,000 | 523 | 0.65 | 9.91 | 8430 |
| | =N⁺(piperidine) | 15 | 446 | 34,600 | 522 | 0.66 | 9.97 | 7630 |

ᵃall values in PBS, pH 7.4

FIG. 2G

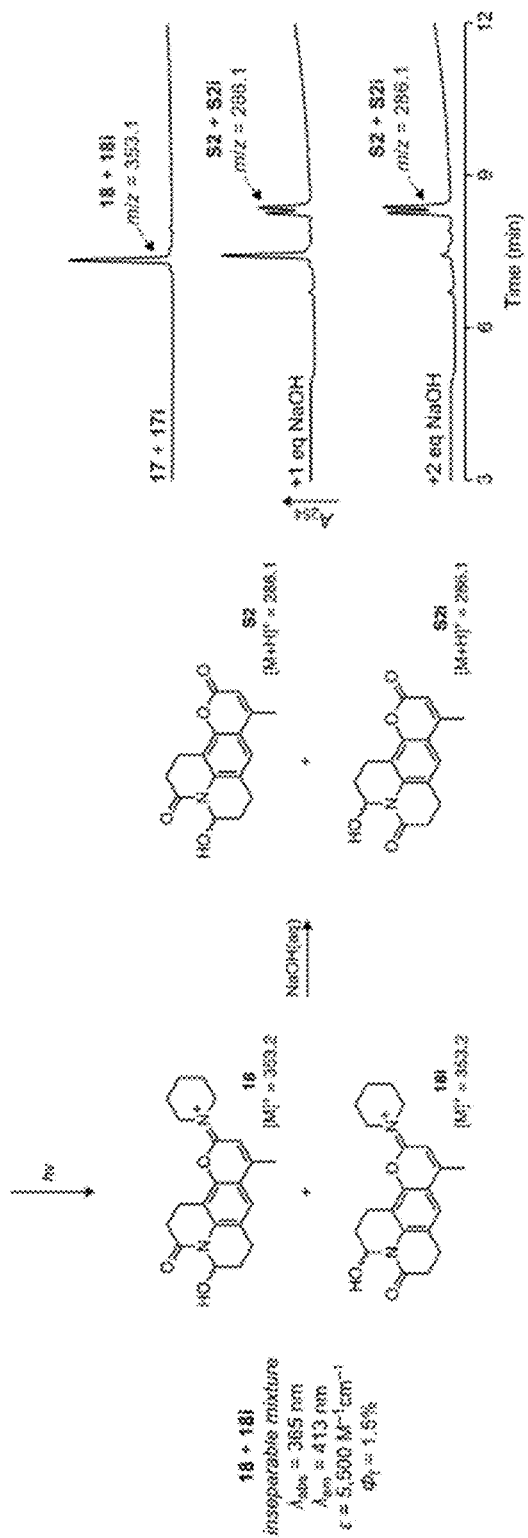
FIG. 6, Cont'd

| scaffold | solvent | $\lambda_{abs}$ (nm) | $\varepsilon$ (M$^{-1}$cm$^{-1}$) | $\lambda_{em}$ (nm) | $\Phi_f$ |
|---|---|---|---|---|---|
|  15 | PBS | 446 | 34,600 ⎤ | 522 | 0.66 ⎤ |
| | | | 34% | | 23% |
| | PBS + 0.1% SDS | 453 | 46,200 ⎦ | 525 | 0.81 ⎦ |
| | 1:1 dioxane:H$_2$O | 452 | 41,000 | 523 | 0.86 |
| | 9:1 dioxane:H$_2$O | 450 | 40,900 | 526 | 0.88 |
|  20 | PBS | 447 | 45,200 ⎤ | 524 | 0.45 ⎤ |
| | | | 75% | | 84% |
| | PBS + 0.1% SDS | 455 | 78,900 ⎦ | 525 | 0.83 ⎦ |
| | 1:1 dioxane:H$_2$O | 455 | 68,300 | 524 | 0.84 |
| | 9:1 dioxane:H$_2$O | 450 | 69,100 | 526 | 0.86 |

LIVE-CELL FLUORESCENT MITOCHONDRIAL STAINS

RELATED APPLICATIONS

This application claims priority from U.S. Provisional Application Ser. No. 63/326,546 filed Apr. 1, 2022, the entire disclosure of which is incorporated herein by this reference.

TECHNICAL FIELD

The presently-disclosed subject matter generally relates to fluorescent stains that enable imaging of cellular structures without the need for genetic manipulation. In particular, certain embodiments of the presently-disclosed subject matter relate to unique diaminobenzopyrylium dyes and their use as live-cell mitochondrial stains.

INTRODUCTION

Fluorescence microscopy is an essential tool to interrogate biological structure. A key element in any imaging experiment is the labeling strategy used to localize a fluorophore to the cellular component of interest.[1-5] In addition to measuring the position and movement of specific biomolecules, cellular imaging experiments often involve the visualization of different organelles to quantity their dynamics[6] or provide useful subcellular reference marks.[7-9] Fusing a fluorescent protein to a targeting motif can allow labeling of cellular organelles but requires expression of an exogenous molecule. Fluorescent reagents with affinities for organelle-specific biomolecules can allow imaging without genetic manipulation, but typically involve preparation of a small-molecule fluorophore conjugated to an antibody or drug. An alternative labeling strategy is the use of fluorescent stains that accumulate in specific organelles due to the different chemical environments found in these distinct subcellular regions. Examples include tertiary amine-containing dyes accruing in acidic lysosomes[10] or hydrophobic fluorophores partitioning into lipid droplets.[11]

A widely used fluorescent staining strategy involves mitochondria, whose double membrane structure reflects their role as the powerhouse of the cell. The proteins that comprise the electron transport chain reside in the inner mitochondrial membrane that separates the matrix from the intermembrane space. Their activity drives protons across the inner membrane, resulting in a large voltage difference between these two compartments. This unique membrane potential drives the accumulation of lipophilic cations into the matrix or inner membrane. This was first observed with Rhodamine 123 (1),[12] where esterification of the standard ortho-carboxyl group found in rhodamines endows the molecule with a fixed cationic charge. The strategy was expanded to the tetramethylrhodamine methyl ester (TMRM, 2), yielding a red-shifted mitochondrial stain.[13] This general idea was refined with the development of MitoTracker Orange (3), in which the carboxyl ester functionality found in rhodamines 1 and 2 is discarded entirely.[7] Compound 3 also incorporates a chloromethyl moiety to allow formation of a glutathione adduct, thereby trapping the fluorophore inside the cell.[14]

The majority of fluorescent mitochondrial stains are based on rhodamine (e.g., 1-3) and cyanine structures.[7] These dyes exhibit relatively long absorption maxima ($\lambda_{abs}$) and fall into the standard blue (488 nm), green-yellow (560 nm), and red (640 nm) excitation windows used in fluorescence imaging. Mitochondrial stains excited with violet light (405 nm) have received less attention since there is no general cationic dye scaffold with an excitation maximum in this wavelength range. Described herein is a new class of mitochondrial stains based on 2,7-diaminobenzopyrylium (DAB) dyes.

SUMMARY

The presently-disclosed subject matter meets some or all of the above-identified needs, as will become evident to those of ordinary skill in the art after a study of information provided in this document.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

The presently disclosed subject matter includes a compound of the following formula (I):

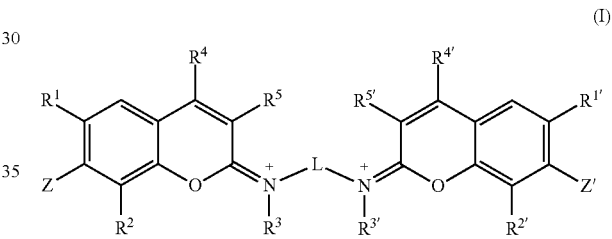

In the compound of formula (I), L is selected from the group consisting of alkyl, substituted alkyl, and —(CH$_2$CH$_2$O)$_n$CH$_2$CH$_2$— where n is from 1 to 4. Z and Z' are selected form the group consisting of O(alkyl) and N(alkyl)$_2$. $R^1$ and $R^{1'}$ are selected from the group consisting of halogen, H, D, alkyl, and substituted alkyl; or $R^1$ and Z, and $R^{1'}$ and Z', taken together with the carbon atoms to which they are bonded, form a substituted or unsubstituted ring containing 5, 6, 7, 8, or 9 atoms. $R^2$ and $R^{2'}$ are selected from the group consisting of halogen, H, D, alkyl, and substituted alkyl; or $R^2$ and Z, and $R^{2'}$ and Z', taken together with the carbon atoms to which they are bonded, form a substituted or unsubstituted ring containing 5, 6, 7, 8, or 9 atoms. $R^3$ and $R^{3'}$ are selected from the group consisting of alkyl and substituted alkyl; or $R^3$, taken together with the nitrogen atoms to which it is bonded, and $R^{3'}$, taken together with the nitrogen atoms to which it is bonded, form substituted or unsubstituted rings containing 4, 5, 6, 7, 8, or 9 atoms, wherein L is disposed between the ring of $R^3$ and the ring of $R^{3'}$. $R^4$ and $R^{4'}$ are selected from the group consisting of H, halogen, CH$_3$, CF$_3$, CN, COO(alkyl), COO(aryl), alkyl, substituted alkyl, aryl, substituted aryl, alkenyl, and substituted alkenyl; and $R^5$ and $R^{5'}$ are selected from the group consisting of H, halogen, CH$_3$, CF$_3$, CN, COO(alkyl), COO(aryl), alkyl, substituted alkyl, aryl, substituted aryl, alkenyl, and substituted alkenyl; or $R^4$ and $R^5$, and $R^{4'}$ and $R^{5'}$, taken together with the carbon atoms to which they are bonded, form substituted or unsubstituted rings containing 5, 6, 7, 8, or 9 carbon atoms.

In some embodiments of the presently-disclosed subject matter, the compound is selected from the following:
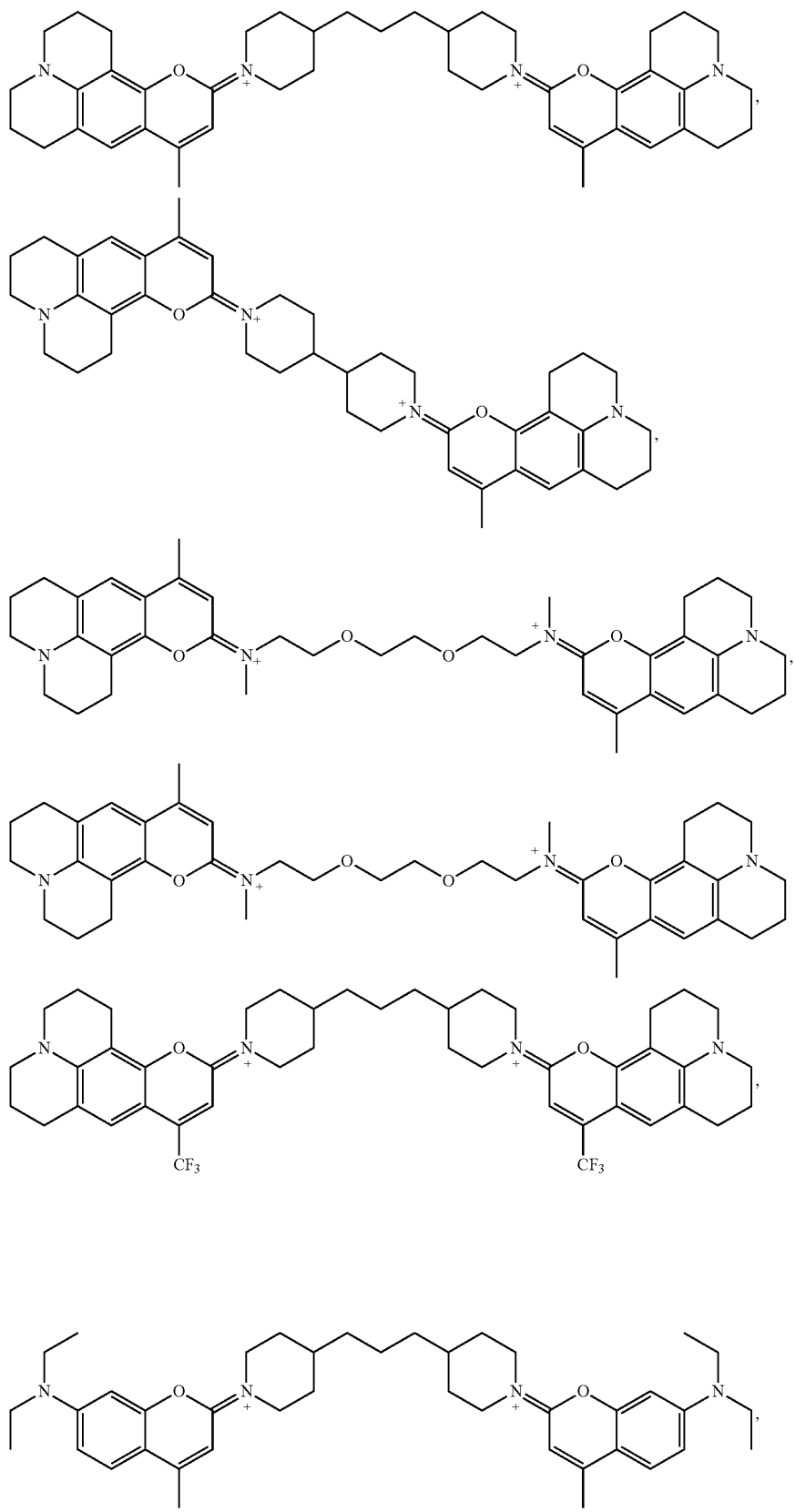

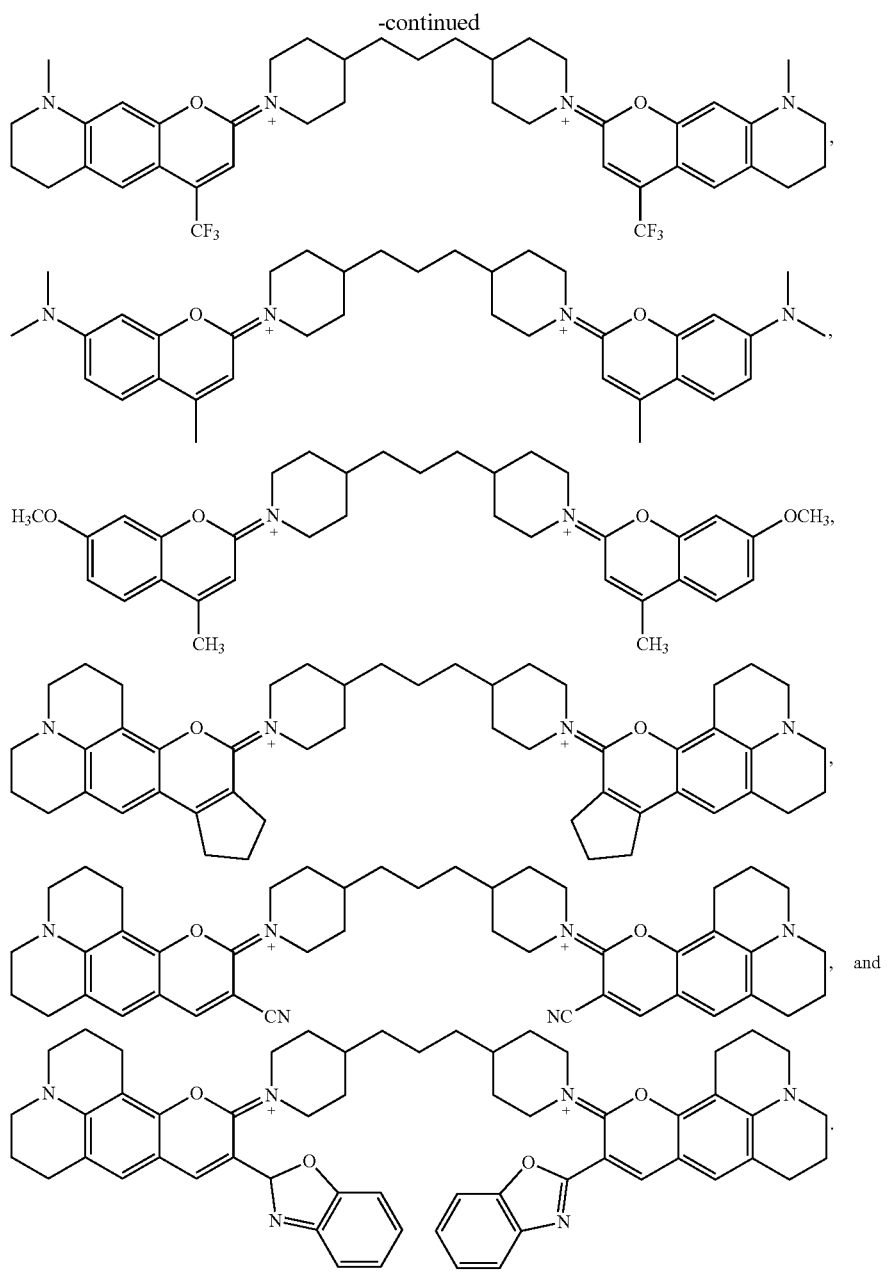

-continued

The presently-disclosed subject matter further includes a method of imaging a sample comprising a cell. Embodiments of the method involve contacting the sample with a compound as disclosed herein and exposing the sample to light. Upon exposure to light, an emission can be detected, allowing the sample to be imaged.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are used, and the accompanying drawings of which:

FIG. 1A: Chemical structures of mitochondrial stains 1-3. FIG. 1B: Pairs of structurally consonant dyes: 4-methylumbelliferone (4) and fluorescein (5); Coumarin 1 (6) and N,N-diethylrhodol (7); 2,7-diaminobenzopyrylium 8 and Rhodamine B (9).

(FIG. 2B) 10-11; (FIG. 2C) 12-15. (FIG. 2D-2F) Plot of normalized fluorescence vs. irradiation time of (FIG. 2D) 6 and 8; (FIG. 2E) 10-11; (FIG. 2F) 12-15 with monoexponential fit; (FIG. 2G) Table including spectral properties of DAB dyes.

(FIG. 3A) Spontaneous hydrolysis of 15 to form coumarin 12. (FIG. 3B)

LC-MS chromatograms of 15 in PBS, pH 7.4 at t=0 (top), 15 at t=48 h (middle), and standard 12 (bottom). (FIG. 3C) Photochemistry of 15 to form oxidized adducts 16-18. (FIG. 3D) LC-MS chromatograms of 15 in PBS, pH 7.4 in the absence of light (top), 15 after 5 min illumination with 405 nm light (middle), and 15 after 20 min illumination with 405 nm light (bottom).

(FIG. 4A) Spontaneous hydrolysis of 8 to form coumarin 6 and LC-MS chromatograms of 8 at t=0 (top), 8 at t=48 h (middle), and 6 (bottom). (FIG. 4B) Spontaneous hydrolysis of 11 to form coumarin 10 and LC-MS chromatograms of 11 at t=0 (top), 11 at t=48 h (middle), and 10 (bottom). (FIG. 4C) Spontaneous hydrolysis of 13 to form coumarin 12 and LC-MS chromatograms of 13 at t=0 (top), 13 at t=48 h (middle), and 12 (bottom). (FIG. 4D) Spontaneous hydrolysis of 14 to form coumarin 12 and LC-MS chromatograms of 14 at t=0 (top), 14 at t=48 h (middle), and 12 (bottom).

(FIG. 5A) Full plot. (FIG. 5B) Zoom-in of the ordinate to better show differences in hydrolysis rates. Error bars indicate SEM.

(FIG. 9A) Synthesis of diDAB 20. (FIG. 9B) Normalized absorption (abs) and fluorescence emission (fl) of 15 and 20. (FIG. 9C) Plot of cellular fluorescence vs. time of cells incubated with 15, 20, or MitoView 405 during photobleaching; error bars indicate SEM. (FIG. 9D) Live U2OS cells incubated with DAB 15 (200 nM), diDAB 20 (200 nM), or MitoView 405 (100 nM) after 0, 1, or 2 dye-free media exchange washes. Scale bar: 10 μm.

(FIG. 11A) Beer-Lambert-Bouguer analysis of DAB dyes 15 and 20. Absorbance vs. dye concentration for compounds 15 and 20 in PBS, pH 7.4. Error bars indicate SD. $R^2$ values are from linear regression analysis. (FIG. 11B) Table including spectral properties of DAB 15 and diDAB 20 in different solvents.

DESCRIPTION OF EXEMPLARY EMBODIMENTS

Figure 1A:
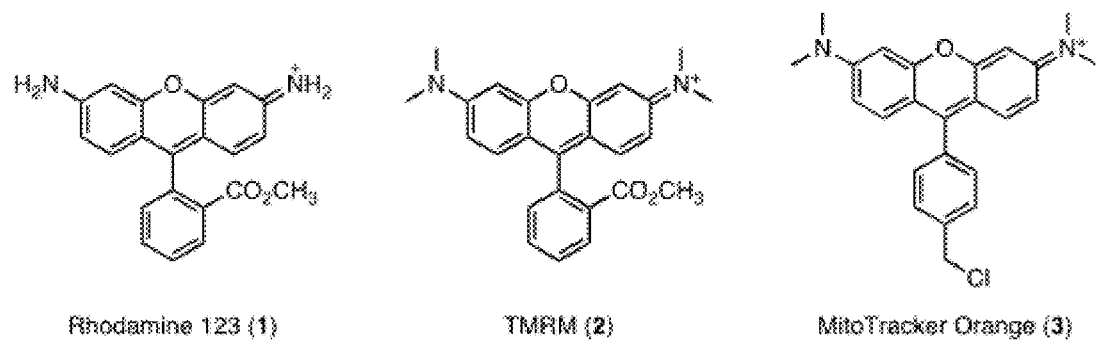
FIGS. 1A and 1B. 2,7-Diaminobenzopyrylium (DAB) dyes as potential mitochondrial stains.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The presently-disclosed subject matter includes fluorescent stains that enable imaging of cellular structures. Some embodiments of the presently-disclosed subject matter include diaminobenzopyrylium dyes. Compounds of the presently-disclosed subject matter are useful as live-cell mitochondrial stains. In this regard, the presently-disclosed subject matter also includes methods if imaging a sample that includes a cell.

The presently disclosed subject matter includes a compound of the following formula (I):

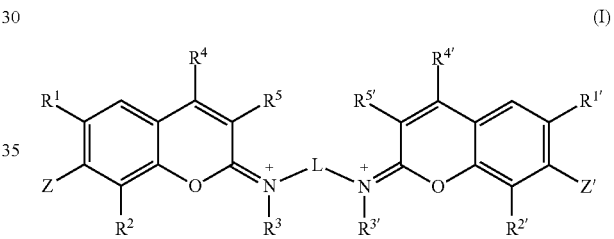

In the compound of formula (I), L is selected from the group consisting of alkyl, substituted alkyl, and —(CH$_2$CH$_2$O)$_n$CH$_2$CH$_2$— where n is from 1 to 4. Z and Z' are selected form the group consisting of O(alkyl) and N(alkyl)$_2$. $R^1$ and $R^{1'}$ are selected from the group consisting of halogen, H, D, alkyl, and substituted alkyl; or $R^1$ and Z, and $R^{1'}$ and Z', taken together with the carbon atoms to which they are bonded, form a substituted or unsubstituted ring containing 5, 6, 7, 8, or 9 atoms. $R^2$ and $R^{2'}$ are selected from the group consisting of halogen, H, D, alkyl, and substituted alkyl; or $R^2$ and Z, and $R^{2'}$ and Z', taken together with the carbon atoms to which they are bonded, form a substituted or unsubstituted ring containing 5, 6, 7, 8, or 9 atoms. $R^3$ and $R^{3'}$ are selected from the group consisting of alkyl and substituted alkyl; or $R^3$, taken together with the nitrogen atoms to which it is bonded, and $R^{3'}$, taken together with the nitrogen atoms to which it is bonded, form substituted or unsubstituted rings containing 4, 5, 6, 7, 8, or 9 atoms, wherein L is disposed between the ring of $R^3$ and the ring of $R^{3'}$. $R^4$ and $R^{4'}$ are selected from the group consisting of H, halogen, CH$_3$, CF$_3$, CN, COO(alkyl), COO(aryl), alkyl, substituted alkyl, aryl, substituted aryl, alkenyl, and substituted alkenyl; and $R^5$ and $R^{5'}$ are selected from the group consisting of H, halogen, CH$_3$, CF$_3$, CN, COO(alkyl), COO(aryl), alkyl, substituted alkyl, aryl, substituted aryl, alkenyl, and substituted alkenyl; or $R^4$ and $R^5$, and $R^{4'}$ and $R^{5'}$, taken together with the carbon atoms to which they are bonded, form substituted or unsubstituted rings containing 5, 6, 7, 8, or 9 carbon atoms.

In some embodiments of the presently-disclosed subject matter, the compound is selected from the following:
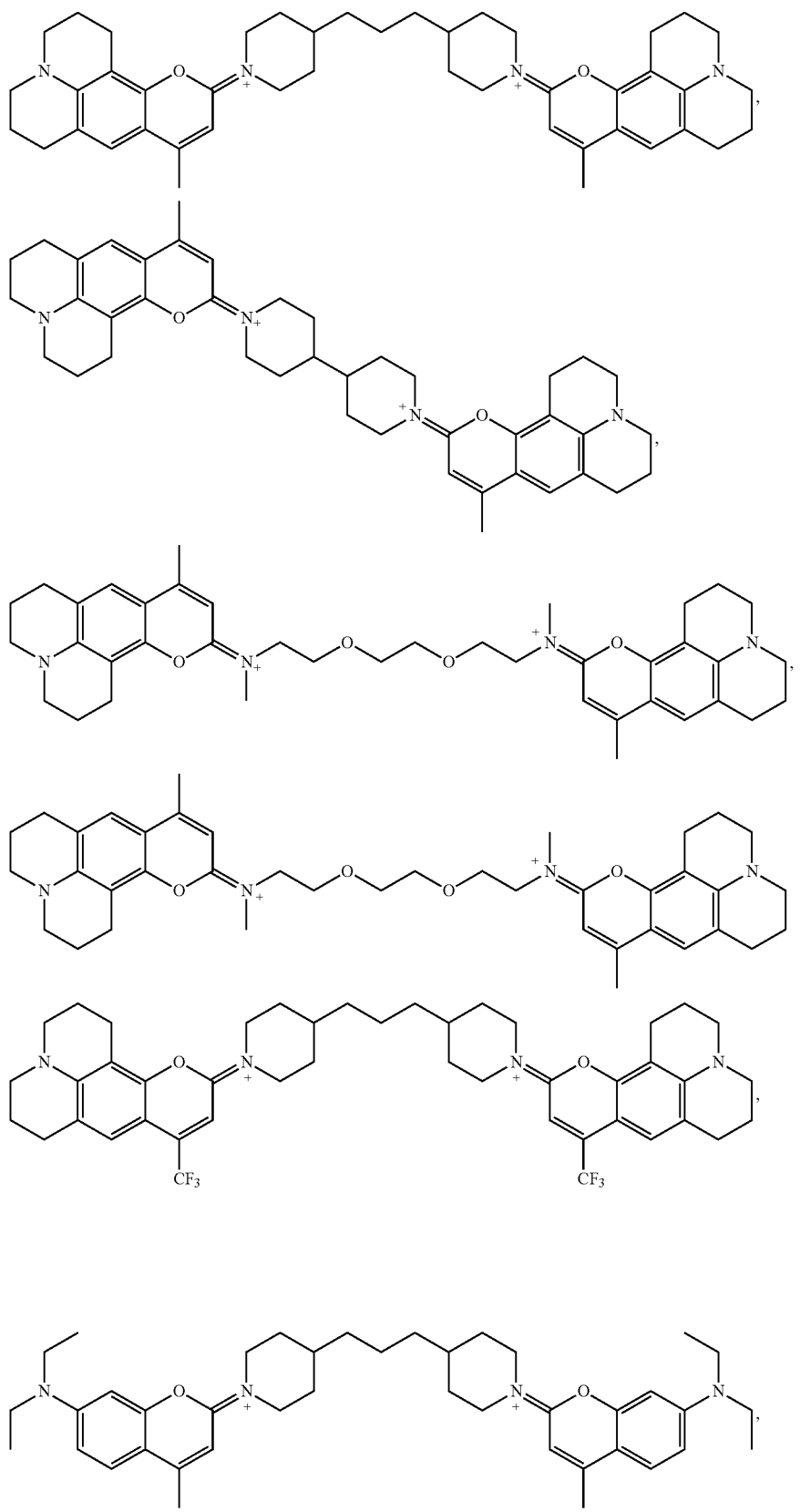

-continued

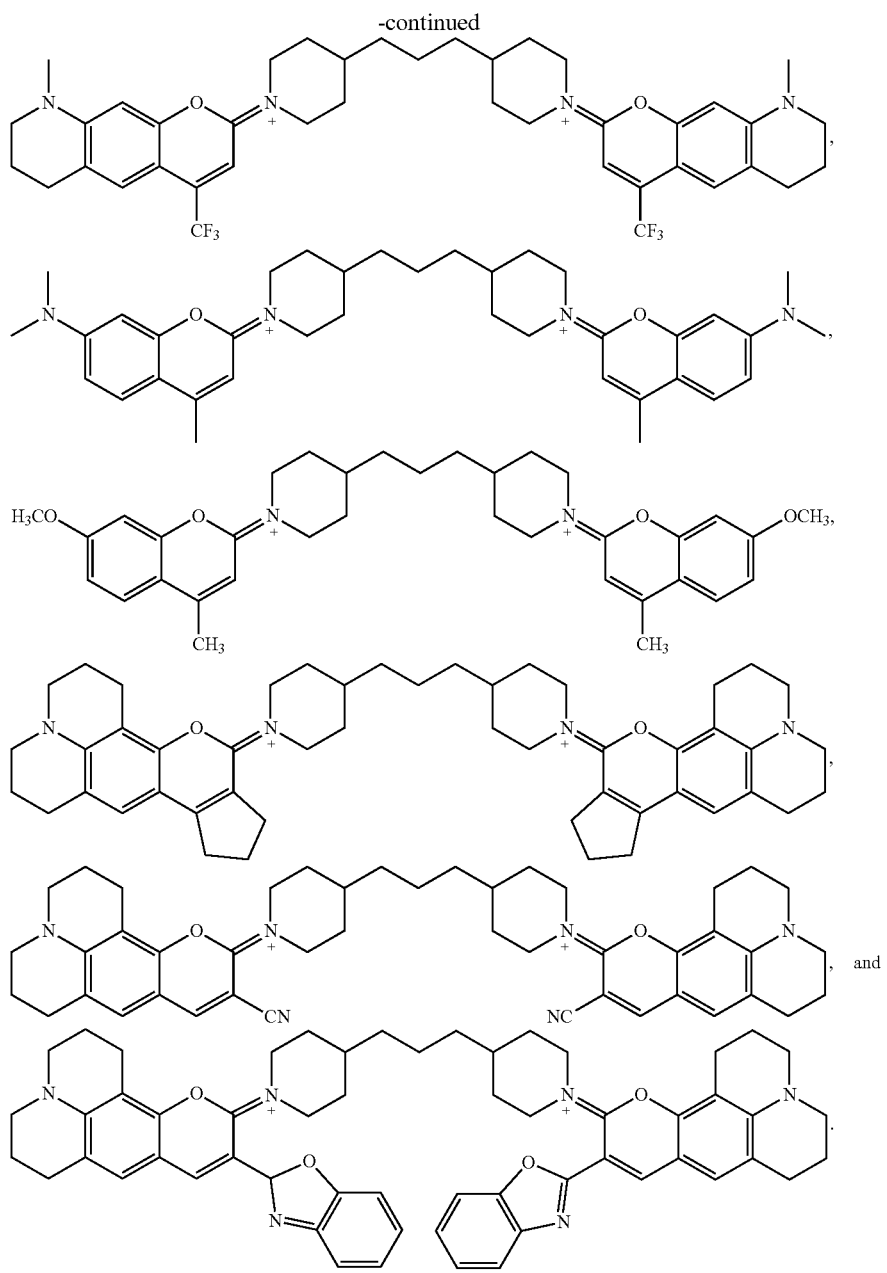

The presently-disclosed subject matter further includes a method of imaging a sample comprising a cell. Embodiments of the method involve contacting the sample with a compound as disclosed herein and exposing the sample to light. Upon exposure to light, an emission can be detected, allowing the sample to be imaged.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, GenBank sequences, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

The present application can "comprise" (open ended) or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, in some embodiments ±0.1%, in some embodiments ±0.01%, and in some embodiments ±0.001% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

The term "absorption wavelength" as used herein refers to the wavelength of light capable of being absorbed by a compound in order to excite the compound to emit a light. The light emitted from a compound that has been excited with an absorption light will have an "emission wavelength."

As used herein, the term "derivative" refers to a compound having a structure derived from the structure of a parent compound (e.g., a compounds disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds.

Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. Unless stated otherwise, all chemical groups described herein include both unsubstituted and substituted varieties.

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

Where substituent groups are specified by their conventional chemical formula written from left to right, they equally encompass the chemically identical substituents that would result from writing the structure from right to left. For instance, —$CH_2O$— also encompasses recite —$OCH_2$—.

It should be understood that the bond types and locations in the chemical structures provided herein may adapt depending on the substituents in the compound, even if not specifically recited. For instance, —X— where X can be either C or N can refer to, respectively, —CH2- or —NH—, where the lone pair of electrons on N is not illustrated. Thus, even if not specifically illustrated, the chemical compounds described herein include any hydrogen atoms, lone pair of electrons, and the like necessary for completing a chemical structure.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also refer to both substituted or unsubstituted alkyls. For example, the alkyl group can be substituted with one or more groups including, but not limited to, optionally substituted alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term. The term "alkyl" is inclusive of "cycloalkyl."

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, optionally substituted alkyl, cycloalkyl, alkoxy, amino, ether, halide, hydroxy, nitro, silyl, sulfo-oxo, or thiol as described herein.

In this regard, the term "heterocycle," as used herein refers to single and multi-cyclic aromatic or non-aromatic ring systems in which at least one of the ring members is other than carbon. Heterocycle includes pyridinde, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridine, pyridazine, pyrimidine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like.

The terms "alkoxy" and "alkoxyl" as used herein to refer to an alkyl or cycloalkyl group bonded through an ether linkage; that is, an "alkoxy" group can be defined as $-OA^1$ where $A^1$ is alkyl or cycloalkyl as defined above. "Alkoxy" also includes polymers of alkoxy groups as just described; that is, an alkoxy can be a polyether such as $-OA^1-OA^2$ or $-OA^1-(OA^2)_a-OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. The term is include of linear and ring-forming (i.e., cycloakenyl) groups. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, haide, hydroxy, ketone, azide, nitro, silyl, sulfo-oxo, or thiol, as described herein.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "ring" as used herein refers to a substituted or unsubstituted cycloalkyl, substituted or unsubstituted heterocycloalkyl, substituted or unsubstituted aryl, or substituted or unsubstituted heteroaryl. A ring includes fused ring moieties, referred to as a fused ring system wherein a ring may be fused to one or more rings selected from a substituted or unsubstituted cycloalkyl, substituted or unsubstituted heterocycloalkyl, substituted or unsubstituted aryl, and substituted or unsubstituted heteroaryl in any combination. The number of atoms in a ring is typically defined by the number of members in the ring. For example, a "5- to 8-membered ring" means there are 5 to 8 atoms in the encircling arrangement. A ring can optionally include a heteroatom. The term "ring" further includes a ring system comprising more than one "ring", wherein each "ring" is independently defined as above.

Some of the unsaturated structures described herein, such as ring structures including cycloalkyl and aryl, are illustrated with dashed bonds to signify the potential existence of a resonance structure. Structures having dashed bonds are intended to reflect every possible configuration of the structure, but does not necessarily imply that all possible structures are in existence. It should be understood that the types of bonds (e.g., single bond, double bond) in such structures will vary depending on the atoms in the structure as well as whether the structures are substituted with one or more additional atoms or moieties.

The term "aldehyde" as used herein is represented by a formula $-C(O)H$. Throughout this specification "C(O)" is a short hand notation for a carbonyl group, i.e., C=O.

The terms "amine" or "amino" as used herein are represented by a formula $NA^1A^2A^3$, where $A^1$, $A^2$, and $A^3$ can be, independently, hydrogen or optionally substituted alkyl, cycloalkyl, alkenyl, cycloalkenyl, alkynyl, cycloalkynyl, aryl, or heteroaryl group as described herein. In specific embodiments amine refers to any of $NH_2$, NH(alkyl), NH(aryl), N(alkyl)$_2$, and N(aryl)$_2$.

The term "carboxylic acid" as used herein is represented by a formula —C(O)OH.

The term "ester" as used herein is represented by a formula —OC(O)A$^1$ or —C(O)OA$^1$, where A$^1$ can be an optionally substituted alkyl, cycloalkyl, alkenyl, cycloalkenyl, alkynyl, cycloalkynyl, aryl, or heteroaryl group as described herein. The term "polyester" as used herein is represented by a formula -(A$^1$O(O)C-A$^2$-C(O)O)$_a$— or -(A$^1$O(O)C-A$^2$-OC(O))$_a$—, where A$^1$ and A$^2$ can be, independently, an optionally substituted alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "halide" or "halogen" refers to at least one of the halogens selected from fluorine, chlorine, bromine, and iodine.

The term "thiol" as used herein is represented by a formula —SH.

The presently-disclosed subject matter is further illustrated by the following specific but non-limiting examples. The following examples may include compilations of data that are representative of data gathered at various times during the course of development and experimentation related to the present invention.

EXAMPLES

Figure 1B:
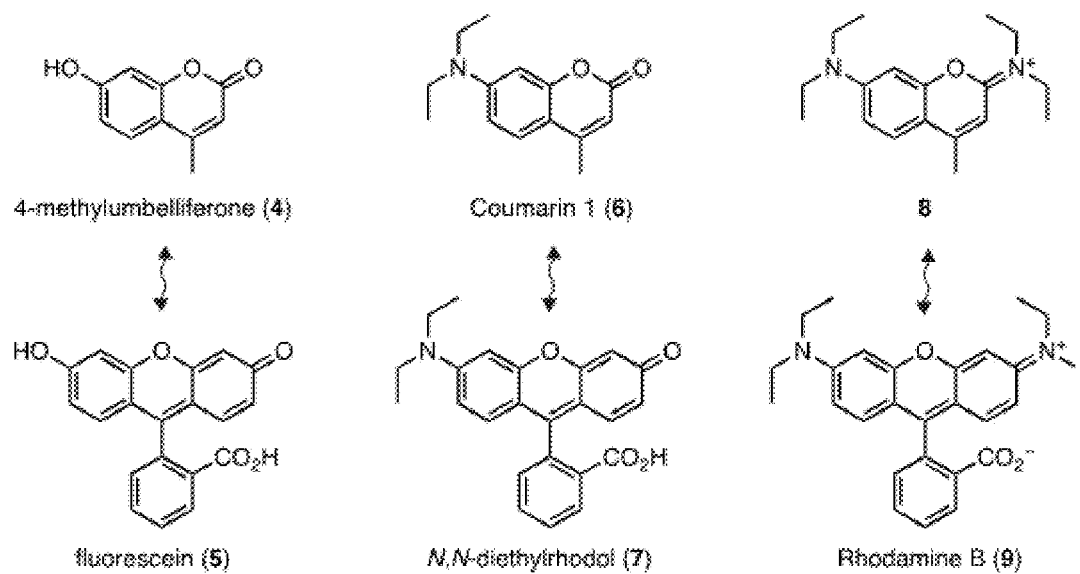

To create a violet-excited mitochondrial stain, coumarin dyes were considered because they remain the most utilized fluorophores excited by ultraviolet (UV) and violet light. The simplest fluorescent coumarins are 7-hydroxy derivatives such as 4-methylumbelliferone (4, FIG. 1B). The classic fluorophore fluorescein (5) is effectively the phenylog of 4. Similarly, 7-aminocoumarins such as Coumarin 1 (6) are structurally consonant with rhodols like 7. Inspired by the structural relationship between compounds 4/5 and 6/7, consideration was given to 2,7-diaminobenzopyrylium (DAB) structures exemplified by the tetraethyl derivative 8; this is the "coumarin-sized" analog of Rhodamine B (9). Although iminocoumarins have received some attention as dyes[15] and indicators,[16] the cationic 2,7-diaminobenzopyrylium fluorophore scaffold is essentially unexplored, with a lone report in the Soviet chemistry literature from 1989.[17]

Figure 1C:
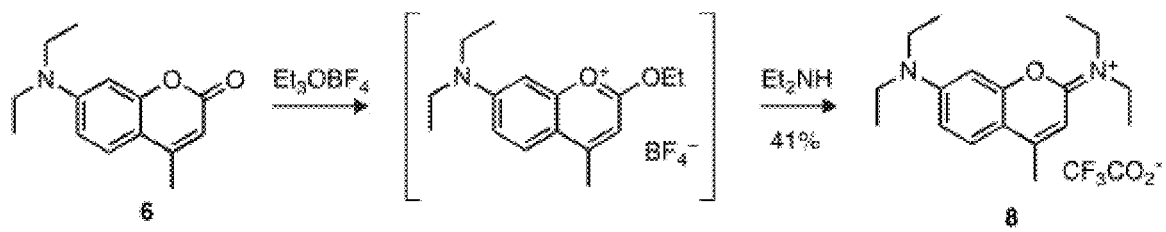
FIG. 1C-1E: Synthesis of dyes 8 (FIG. 1C), 11 (FIG. 1D), and 13-15 (FIG. 1E).
Figure 1D:
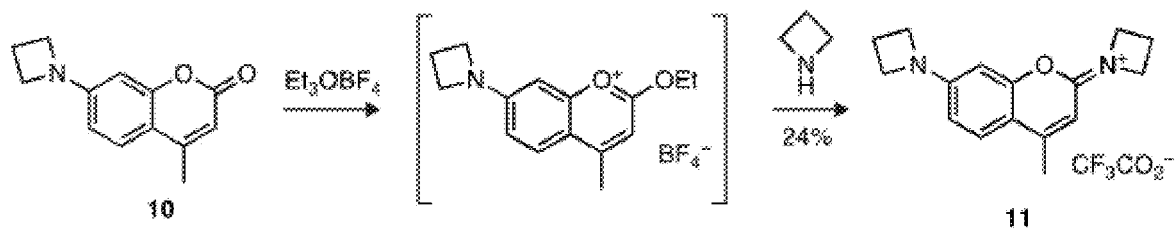
Figure 1E:
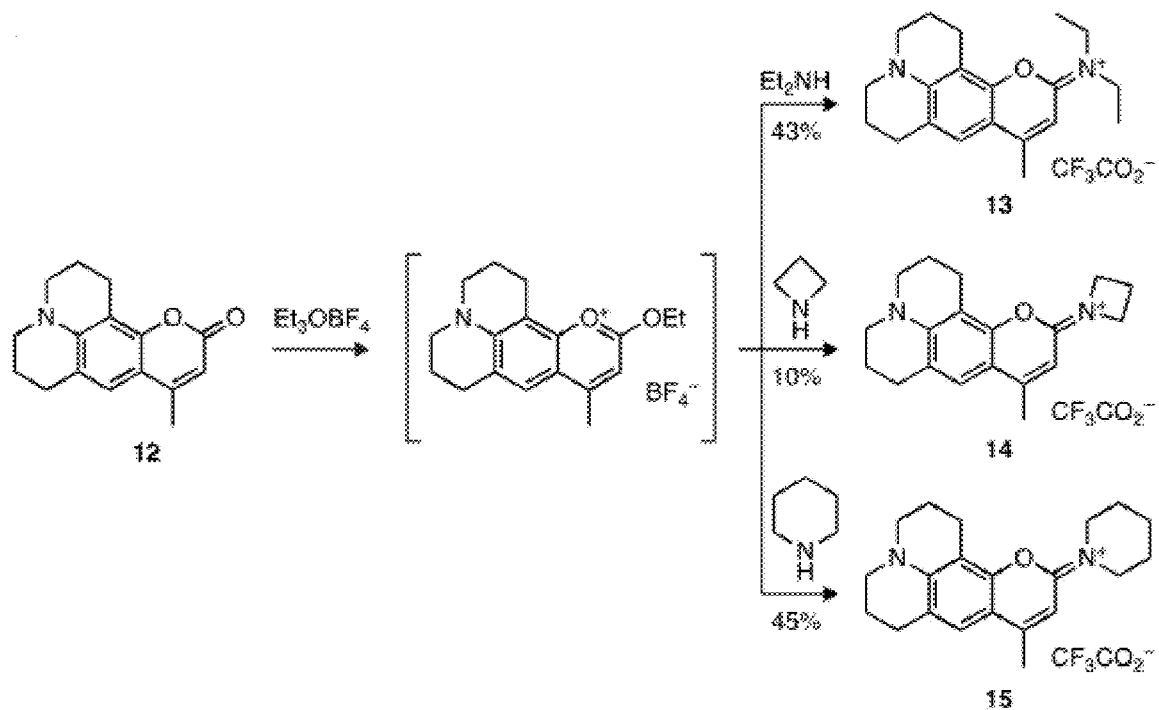

The known tetraethyl DAB dye 8 was synthesized starting from Coumarin 1 (6; FIG. 1C).[17] Treatment with Et$_3$OBF$_4$ generates a 2-ethoxychromenylium intermediate that reacts with diethylamine to give 8, which was obtained in 41% yield. Based on the success of this simple synthetic protocol, additional DAB dyes were prepared. The bright azetidinyl-coumarin[18] 10 was transformed into the diazetidinyl dye 11 (FIG. 1D). Dyes derived from Coumarin 102 (12) were also explored; reaction with diethylamine, azetidine, or piperidine yielded compounds 13-15 (FIG. 1E).

The spectral properties of the DAB dyes 8, 11, and 13-15 were evaluated in phosphate-buffered saline (PBS; FIG. 2A-2C, 2G) and compared to the parent coumarin fluorophores 6, 10, and 12. In general, the transformation of the carbonyl group into an iminium moiety elicits a ~50 nm bathochromic shift in $\lambda_{abs}$ and a 25-35 nm shift in fluorescence emission maxima ($\lambda_{em}$). Thus, all the DAB dyes exhibit $\lambda_{abs}$>400 nm, absorbing in the violet-blue region of the visible spectrum. The reduced shift in $\lambda_{em}$ results in smaller Stokes shifts for the DAB fluorophores relative to the coumarin starting materials. Despite this decrease, the Stokes shifts of the DAB dyes (65-100 nm) remain substantially larger than those of fluoresceins or rhodamines (~25 nm). Finally, for each matched pair, the DAB congeners show substantially higher photobleaching time constants ($t_b$) and average number of photons emitted before photobleaching ($N_p$) relative to the corresponding coumarin dye.

Figure 2A:
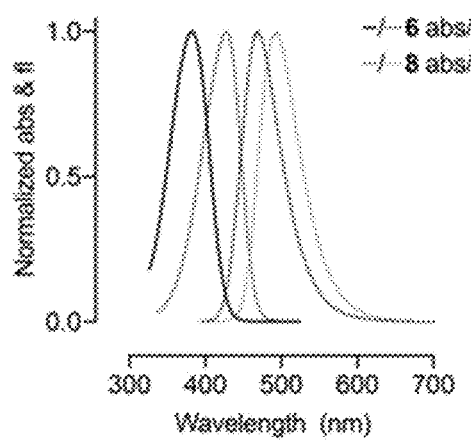
FIG. 2A-2F. Spectra and photobleaching of representative DAB dyes. (a-c) Normalized absorption (abs) and fluorescence emission (fl) of (FIG. 2A) 6 and 8.
Figure 2D:
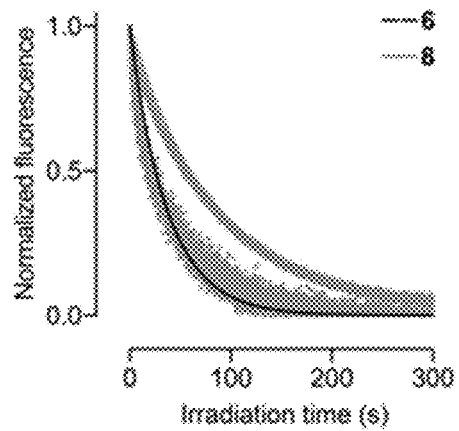
Figure 2B:
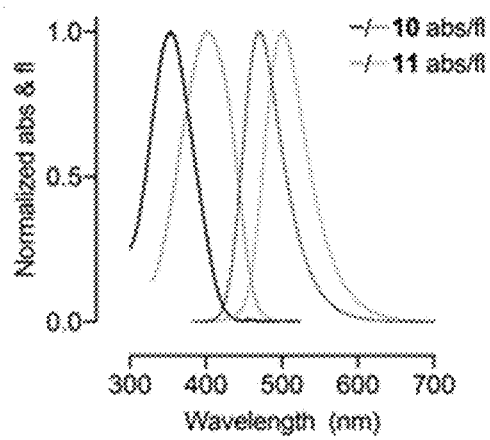
Figure 2E:
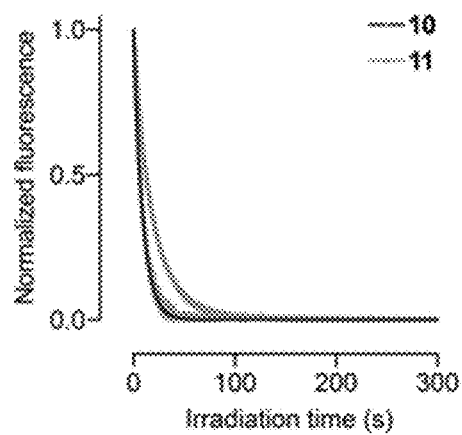
Figure 2C:
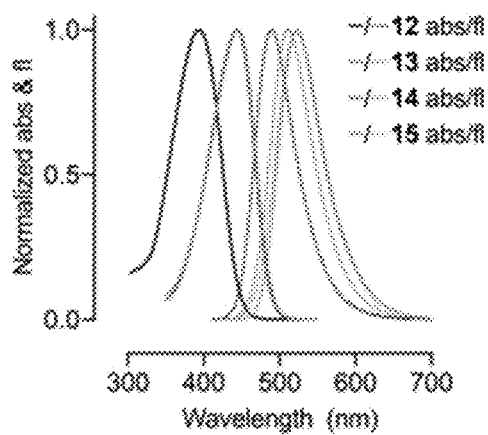

Comparison of specific dye pairs reveal more nuanced differences. The transformation of Coumarin 1 (6) to DAB dye 8 yields a 45 nm shift in $\lambda_{abs}$ and a 26 nm change in $\lambda_{em}$, resulting in a Stokes shift of 65 nm (FIG. 2A, 2G). Conversion of coumarin 10 into diazetidinyl DAB derivative 11 results in a 48 nm bathochromic shift in $\lambda_{abs}$ and a 34 nm difference in $\lambda_{em}$ (FIG. 2B, 2G). This larger shift in emission maximum combined with the properties of the parent coumarin 10 gives a Stokes shift of 99 nm for 11. For DAB dyes 13-15 derived from Coumarin 102 (12), the $\lambda_{abs}$ does not depend on the different secondary amine auxochromes (FIG. 2C, 2G). The fluorescence emission does vary with structure; the acyclic N,N-diethylamino derivative 13 exhibits a $\lambda_{em}$=513 nm, which is 10 nm shorter than 14 and 15, resulting in a smaller Stokes shift=68 nm.

Across the series the absorptivity of the DAB dyes is substantially higher than the parent coumarin fluorophores, with a 1.5-2-fold increase in extinction coefficient at $\lambda_{abs}$ ($\varepsilon$; FIG. 2G). The transformation of the coumarin oxygen into an iminium moiety elicits variable effects on fluorescence quantum yield ($\Phi_f$). For the relatively dim Coumarin 1 (6; $\Phi_f$=0.06) conversion to DAB dye 8 increases quantum yield ($\Phi_f$=0.16). In contrast, diazetidinyl dye 11 shows a modestly lower quantum yield ($\Phi_f$=0.79) compared to the bright azetidinyl coumarin 10 ($\Phi_f$=0.96). The DAB dyes 13-15 exhibit lower $\Phi_f$ values compared to 12. These modest decreases in $\Phi_f$ for compounds 11 and 13-15 are balanced by the larger $\varepsilon$ values, resulting in higher molecular brightness ($\varepsilon \times \Phi_f$) for the DAB dyes relative to the corresponding coumarins.

As mentioned above, the DAB dyes exhibit increased photostability compared to their coumarin congeners. Dyes 8 and 11 gave 1.5-2-fold longer $t_b$ values compared to coumarins 6 and 10 (FIG. 2D-2E, 2G). For compounds 13-15 the photostability improvement is greater, with these DAB compounds showing consistent $t_b$ values that are five-fold higher than the parent coumarin 12 (FIG. 2D, 2G). Since photobleaching reactions stem from excited states, it is difficult to compare photobleaching time constants between dyes with different fluorescence quantum yields and lifetimes; this is reflected in the different bleaching rates observed across the different dye types (FIG. 2D-2G). Therefore, the average total photons ($N_p$) emitted by each dye was calculated.[19] This parameter highlights the increased photostability of the DAB fluorophores and revealed remarkably consistent photostability for compounds 11 and 13-15 with an average of ~8300 photons/dye (FIG. 2G).

Figure 3A:
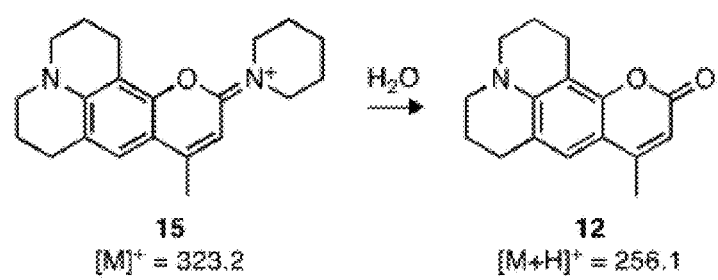
FIG. 3A-3D. Stability of DAB dye 15.
Figure 3B:
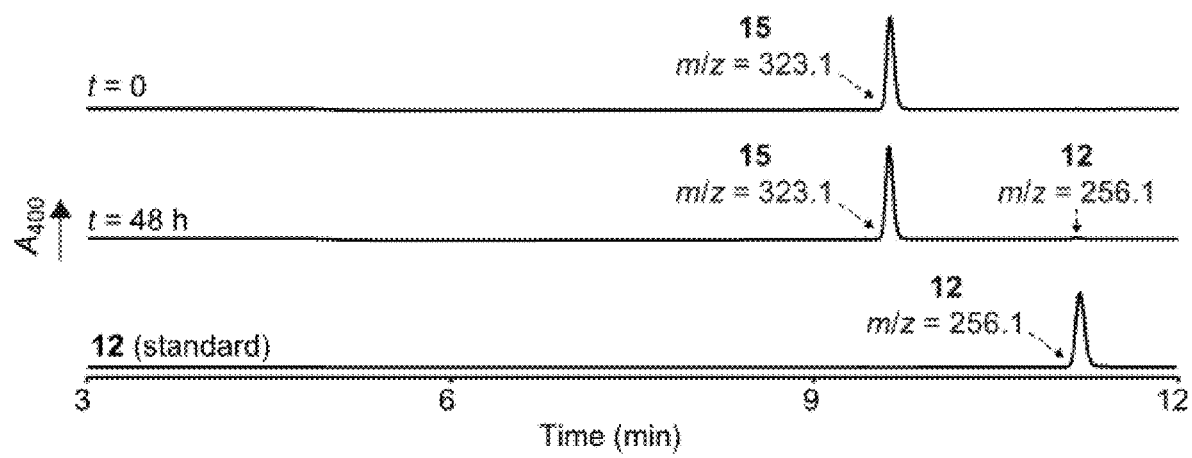
Figure 3C:
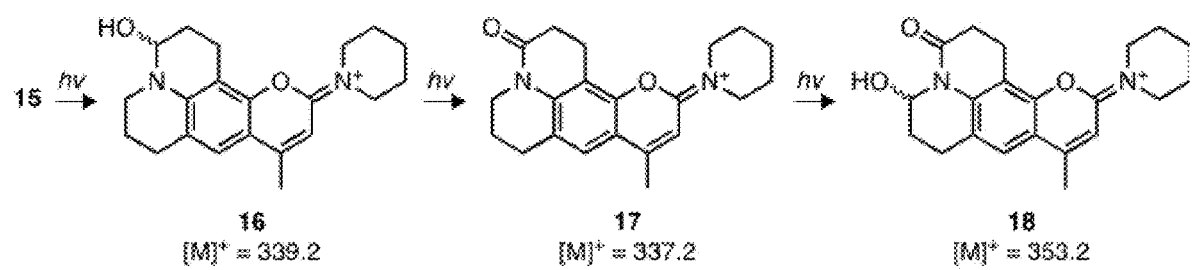
Figure 3D:
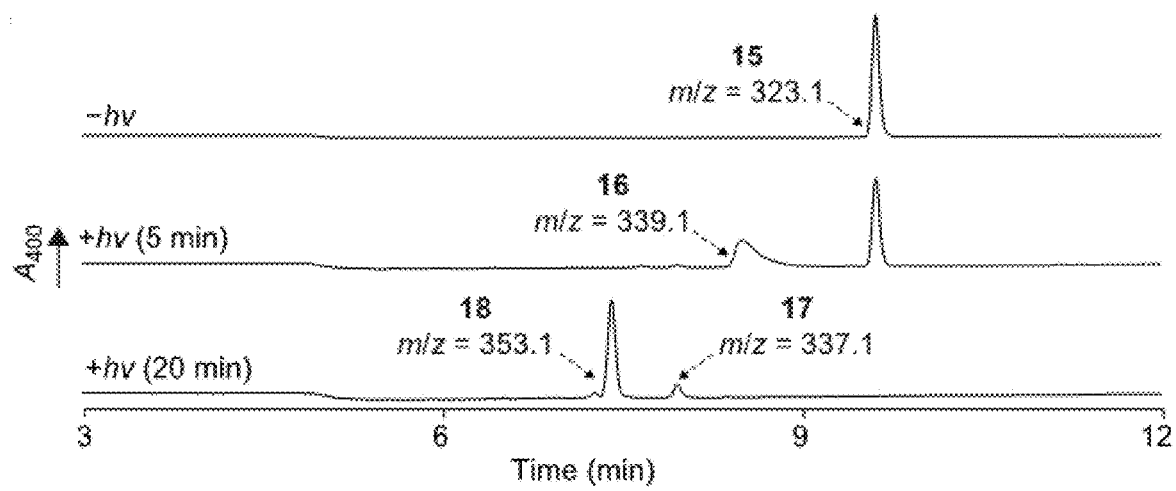
Figure 4A:
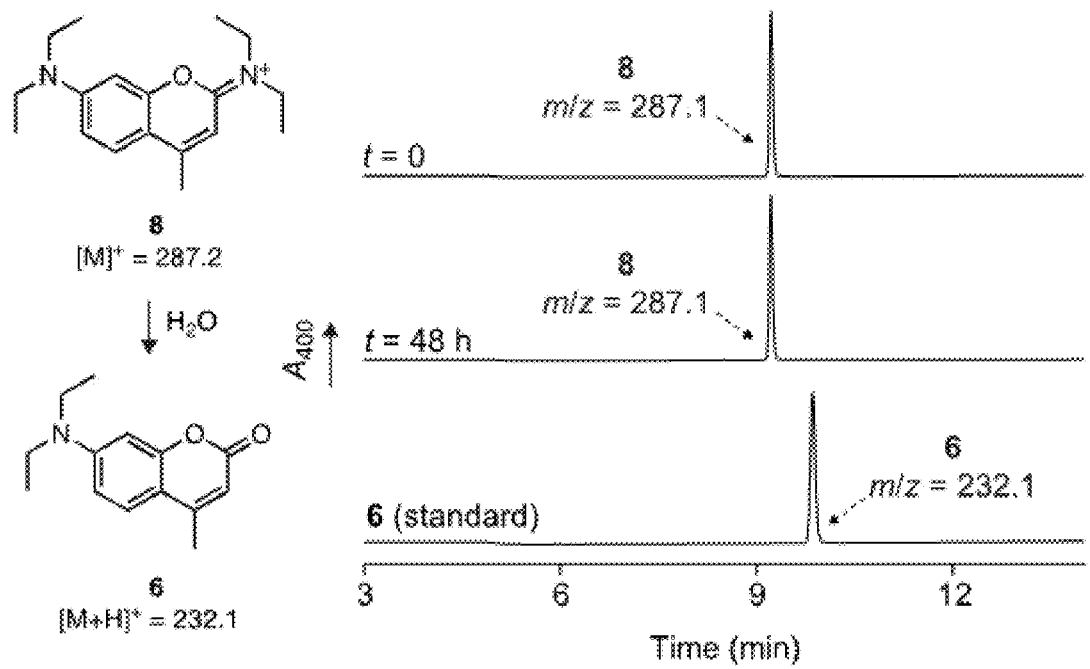
FIG. 4A-D. Chemical stability of DAB dyes 8, 11, and 13-14 in PBS.
Figure 4B:
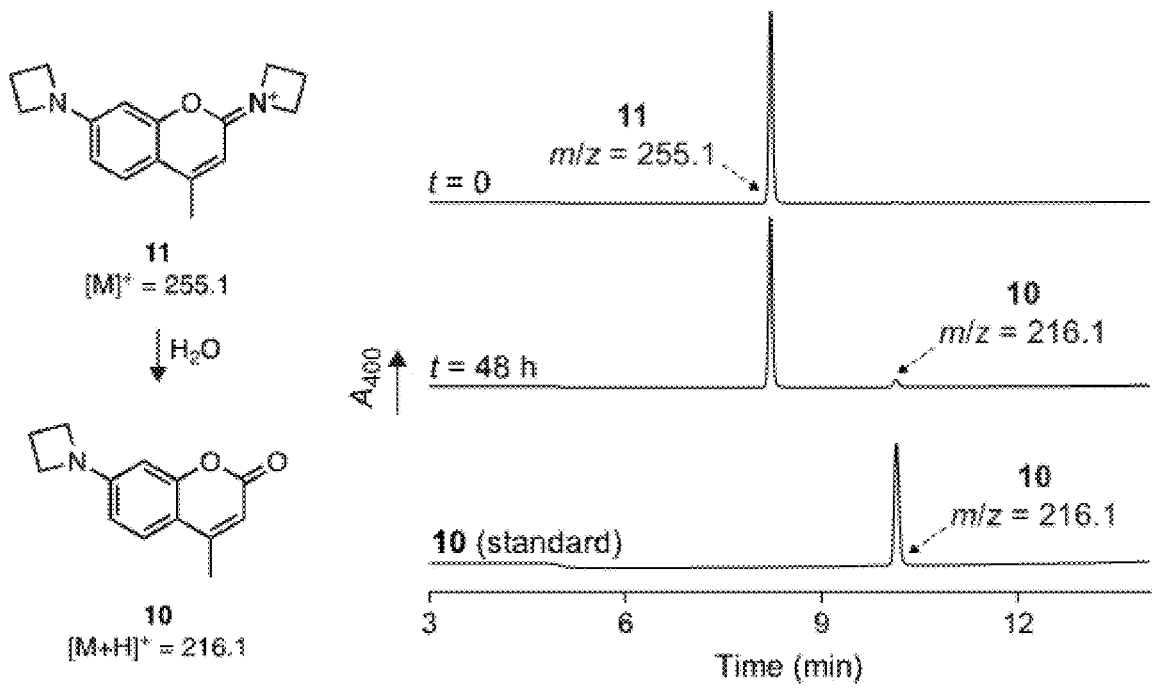
Figure 4C:
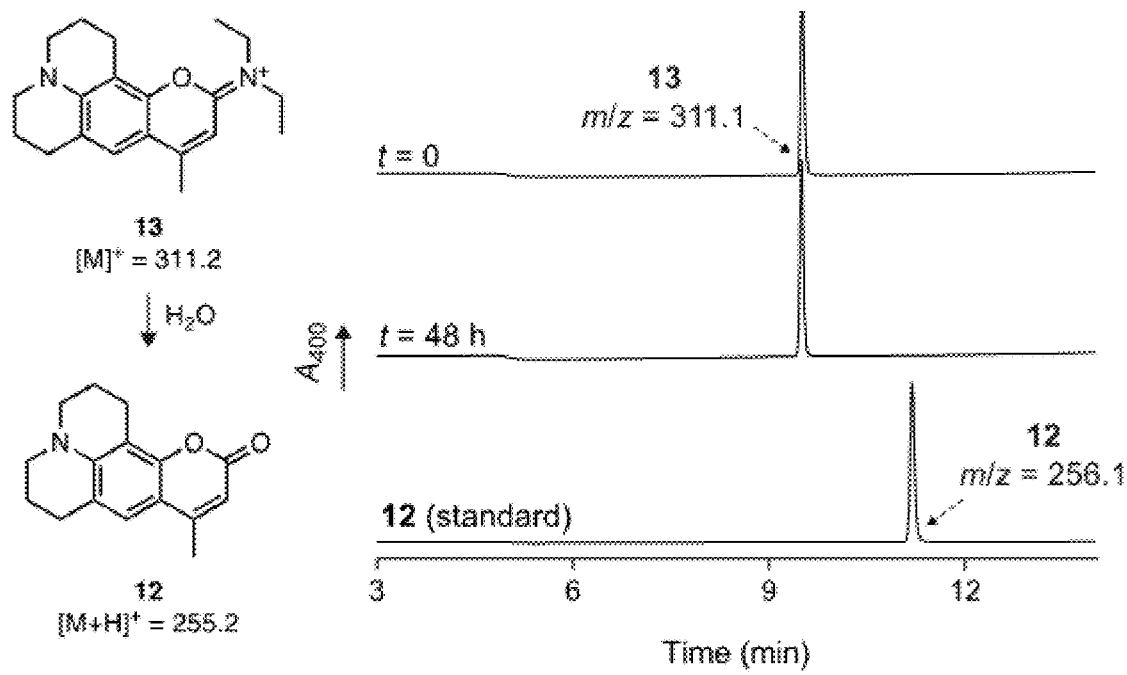
Figure 4D:
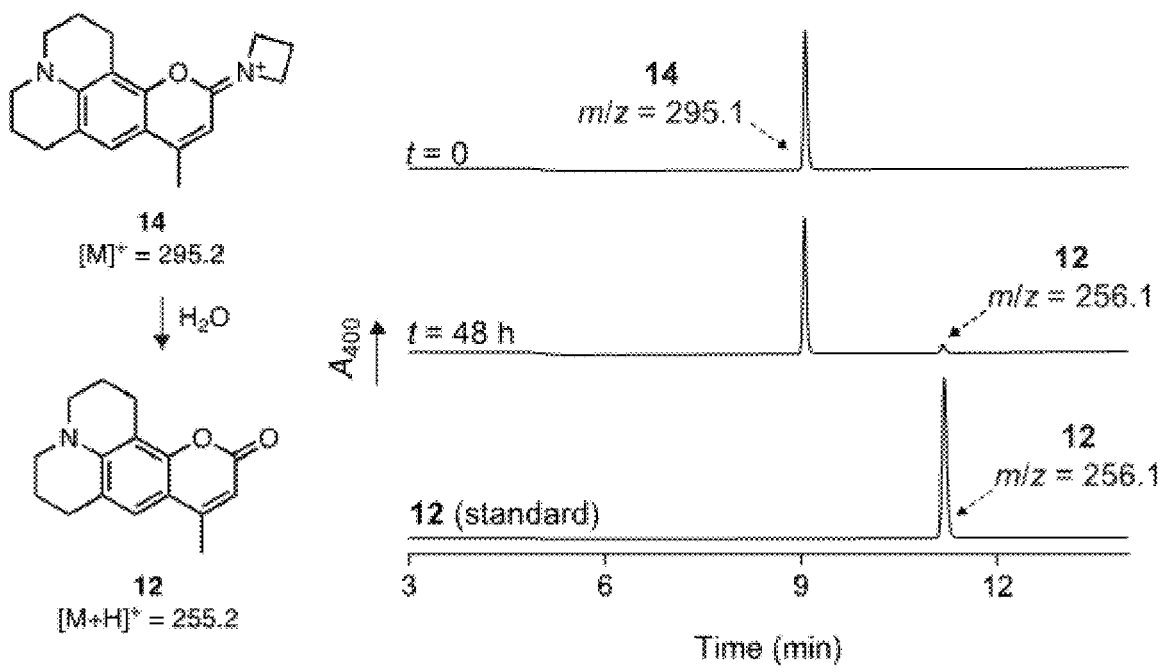
Figure 5A:
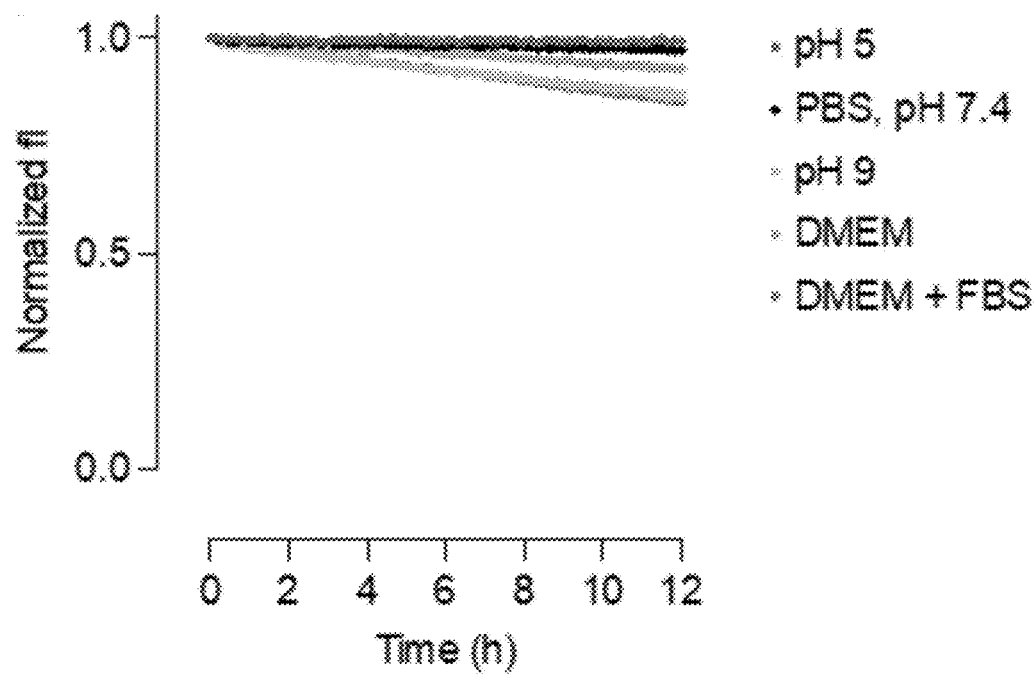
FIGS. 5A and 5B. Chemical stability of DAB dye 15 in different conditions. Normalized fluorescence vs. time for compound 15 in the following conditions: citrate buffer, pH 5; PBS, pH 7.4; Tris buffer, pH 9; Dulbecco's Modified Eagle Medium (DMEM); and DMEM containing 10% v/v fetal bovine serum (DMEM+FBS).
Figure 5B:
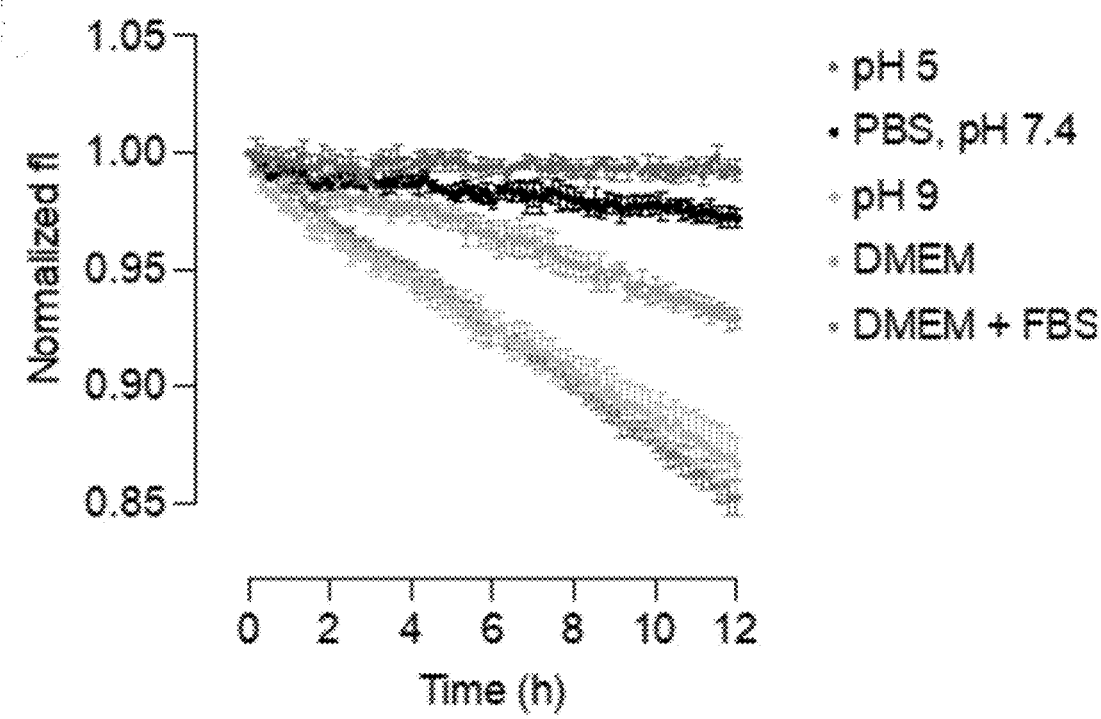
Figure 6:
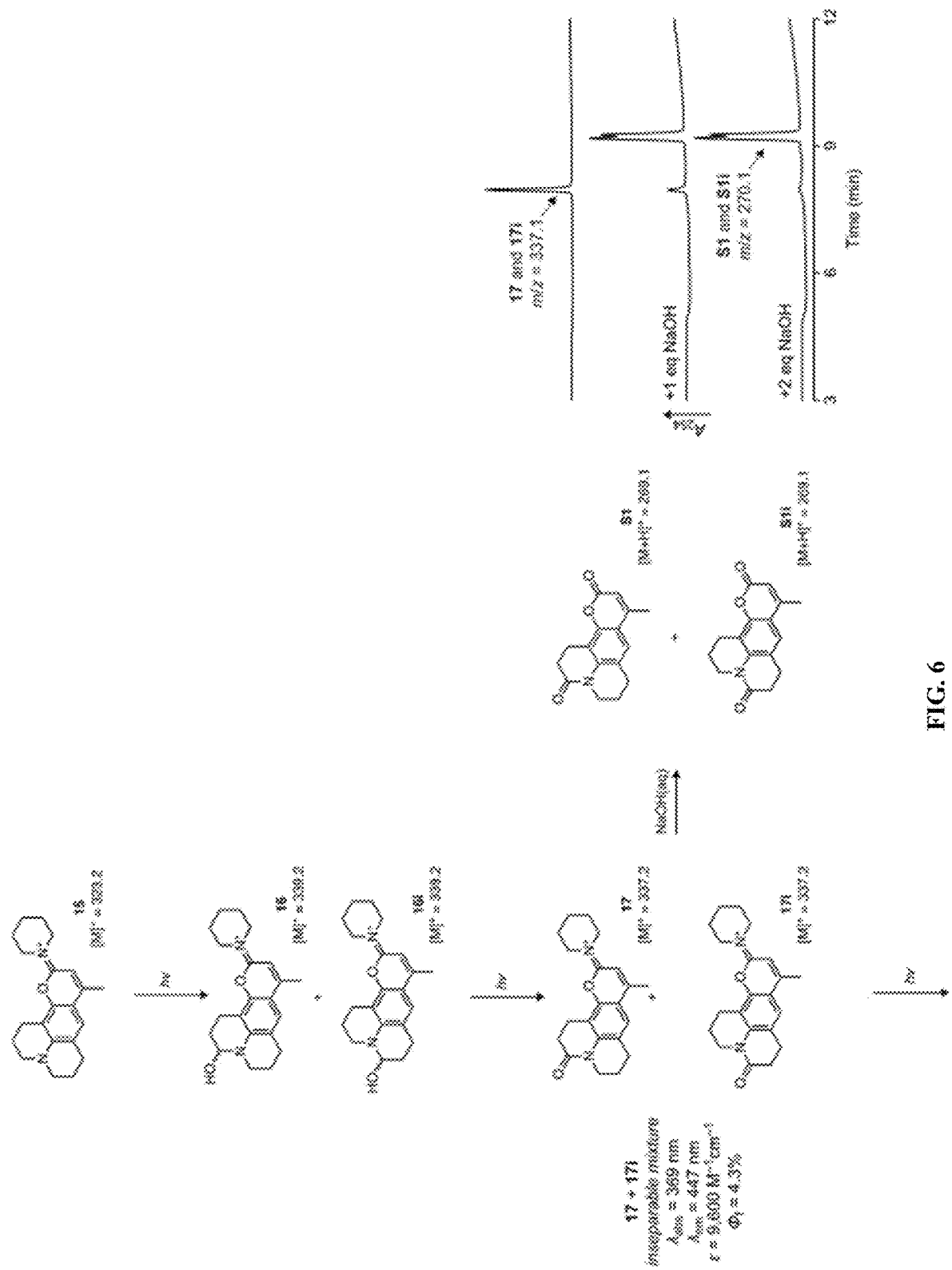
FIG. 6. Photochemistry of DAB 15. Scheme showing the photochemical reactions of 15 to form 16/16i, 17/17i, and 18/18i, spectral properties of oxidized products 17/17i and 18/18i, and hydrolysis products S1/S1i and S2/S2i with accompanying LC-MS traces confirming that photoinduced oxidation primarily occurs on the julolidine system.

We then evaluated the stability of the iminium linkage in aqueous solution under "dark" conditions and under illumination with violet (405 nm) light. Monitoring with tandem liquid chromatography-mass spectrometry (LC-MS) revealed all the DAB dyes 8, 11, 13-15 show excellent stability with minimal iminium hydrolysis after 48 h at pH 7.4 in the absence of light (FIGS. 3A, 3B, and 4A-4D). The stability of dye 15 was also evaluated in different buffer conditions, modestly higher rates of hydrolysis was observed at elevated pH or in cell culture media containing serum (FIGS. 5A and 5B). A comprehensive photochemistry study of 15 was conducted using 405 nm illumination and analysis by LC-MS (FIGS. 3C, 3D, and 6). The photochemical reactions of 15 are similar to those observed with parent coumarin 12 where oxidation appears to be centered on the julolidine ring system;[20-21] no photochemically driven oxidation was detected on the piperidine ring. Overall, these data show the DAB dyes exhibit reasonable chemical stability and the iminium motif is not susceptible to photochemical degradation.

Given the propensity of cationic rhodamines to accumulate in the mitochondria (FIG. 1A), the similarly charged DAB dyes were investigated as live-cell mitochondrial stains. Live U2OS cells were incubated with 200 nM of dyes 8, 11, and 13-15 and co-stained the mitochondria using either MitoTracker Deep Red (FIG. 7) or by transient transfection of HaloTag-TOMM20 and staining with the far-red fluorogenic label Janelia Fluor 635-HaloTag ligand[22] (FIG. 8). In both experiments similar staining patterns were observed between the DAB dyes and the established far-red stain or genetically encoded label, confirming the hypothesis that this positively charged fluorophore scaffold would accumulate in mitochondria. Imaging using the same settings revealed that the julolidine-containing derivatives 13-15 showed brighter staining, perhaps due to increased lipophilicity of the compact cationic structure.

Figure 9A:
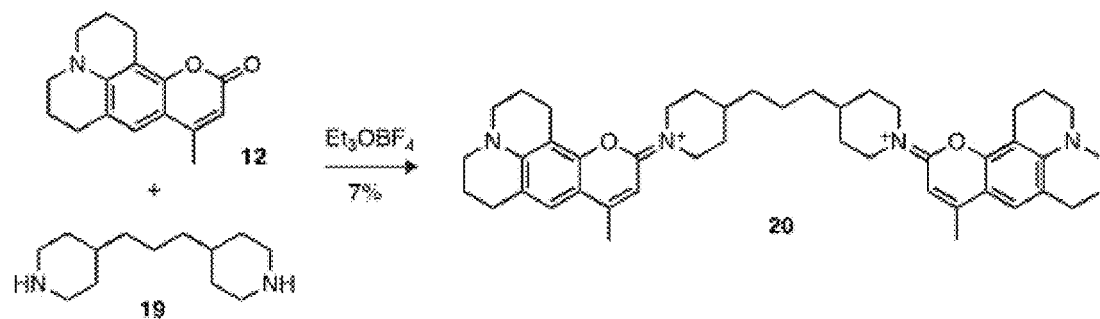
FIG. 9A-9D. Dimerization of DAB dye 15 improves performance as a mitochondrial stain.
Figure 10:
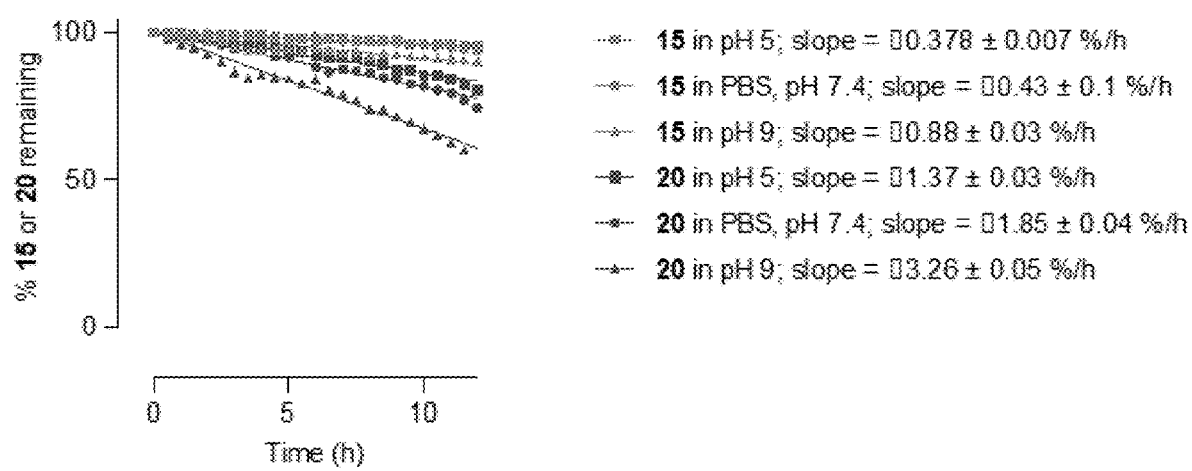
FIG. 10. Comparison of the chemical stability of DAB dyes 15 and 20 in different conditions. Normalized percentage of compound 15 or 20 remaining vs. time for compound 15 in the following conditions: citrate buffer, pH 5; PBS, pH 7.4; Tris buffer, pH 9. The percentage of compound remaining is calculated from HPLC chromatograms taken every 30 min over 12 h. Slopes (±SEM) are calculated from linear regression of these points to allow quantitative comparison of the differences in initial hydrolysis rates.

In these cellular imaging experiments, the cellular intensity of even the best DAB mitochondrial stain 15 rapidly decreased upon media exchange. To further improve this reagent, a dimer derivative of this molecule was prepared by reacting Coumarin 102 (12) with di-piperidine 19 to yield "diDAB" 20 (FIG. 9A). This design is predicated on two concepts. First, the relatively long Stokes shift of the parent dye 15 (FIG. 2C, 2G) should minimize FRET between the two fluorophore moieties and preserve fluorescence quantum yield. Second, the presence of two cationic moieties per molecule of 20 should improve mitochondrial retention. Examination of the chemical properties of 20 revealed a slightly higher rate of hydrolysis relative to 15 in different pH conditions even when considering the presence of two iminium groups (FIG. 10).

Figure 9B:
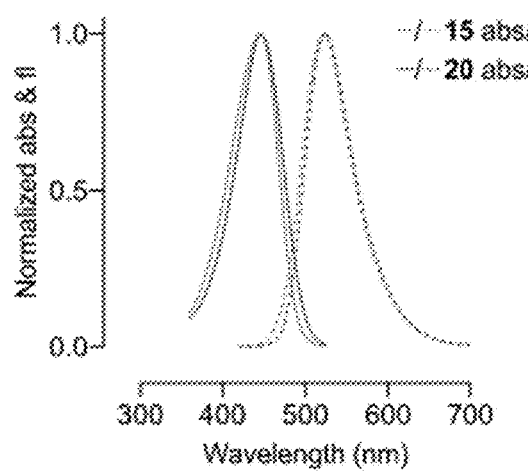
Figure 11A:
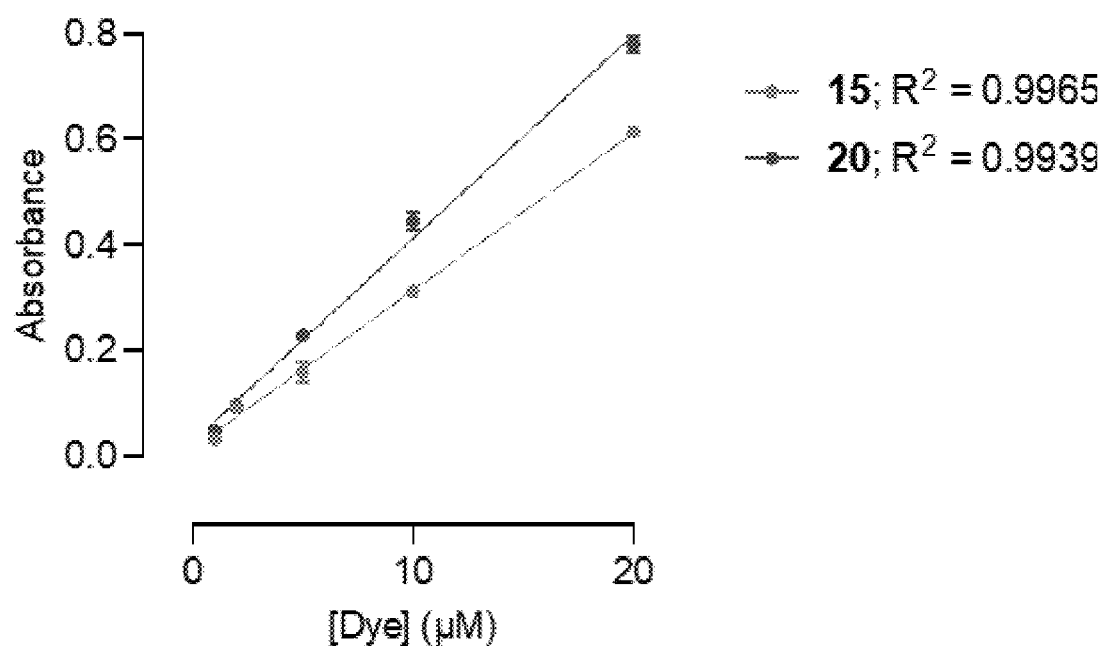
FIGS. 11A and 11B.
Figure 11B:
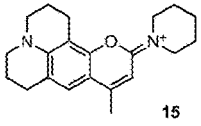
Figure 11B:
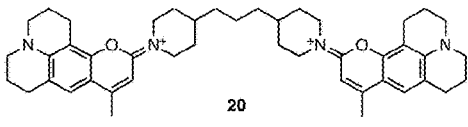

We then measured the spectral properties of the dye dimer. Compound 20 exhibited similar absorption ($\lambda_{abs}$=447 nm) and fluorescence emission ($\lambda_{em}$=524 nm) spectra compared to DAB monomer 15 (FIG. 9B); both dyes showed a linear relationship between absorption and concentration ≤20 µM (FIG. 11A). In aqueous solution the diDAB 20 did not show the expected two-fold increase in absorptivity, however, exhibiting ε=45,200 M$^{-1}$ cm$^{-1}$ along with a modestly lower $\Phi_f$=0.45 (FIG. 11B). To rectify this observation and mimic the nonpolar environment of the mitochondrial inner membrane, the spectral properties of compounds 15 and 20 were measured in sodium dodecyl sulfate (SDS) micelles and dioxane:water mixtures (FIG. 11B). The expected higher ε=78,900 M$^{-1}$ cm$^{-1}$ was observed in PBS containing 0.1% w/v SDS along with a larger $\Phi_f$=0.83; compound 20 is also brighter in dioxane:water mixtures. Although dye 15 also showed higher absorptivity and fluorescence quantum yield in these nonpolar conditions relative to PBS, the effect was less pronounced. It is contemplated that the relatively low ε and $\Phi_f$ observed for compound 20 in aqueous solution is due, in part, to intramolecular interactions between the two chromophore units. These interactions could be reduced in the more hydrophobic environment of SDS micelles or dioxane:water mixtures, resulting in higher absorptivity and fluorescence quantum yield.

Figure 9C:
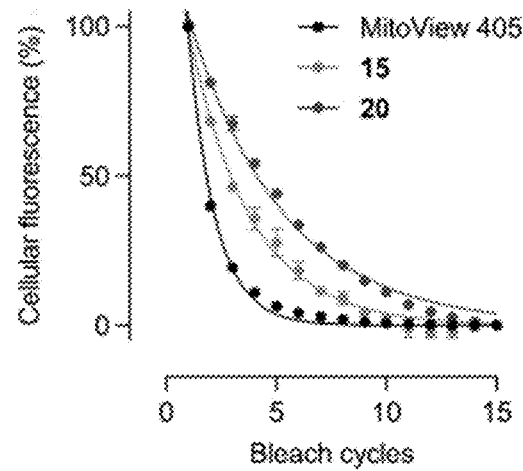
Figure 9D:
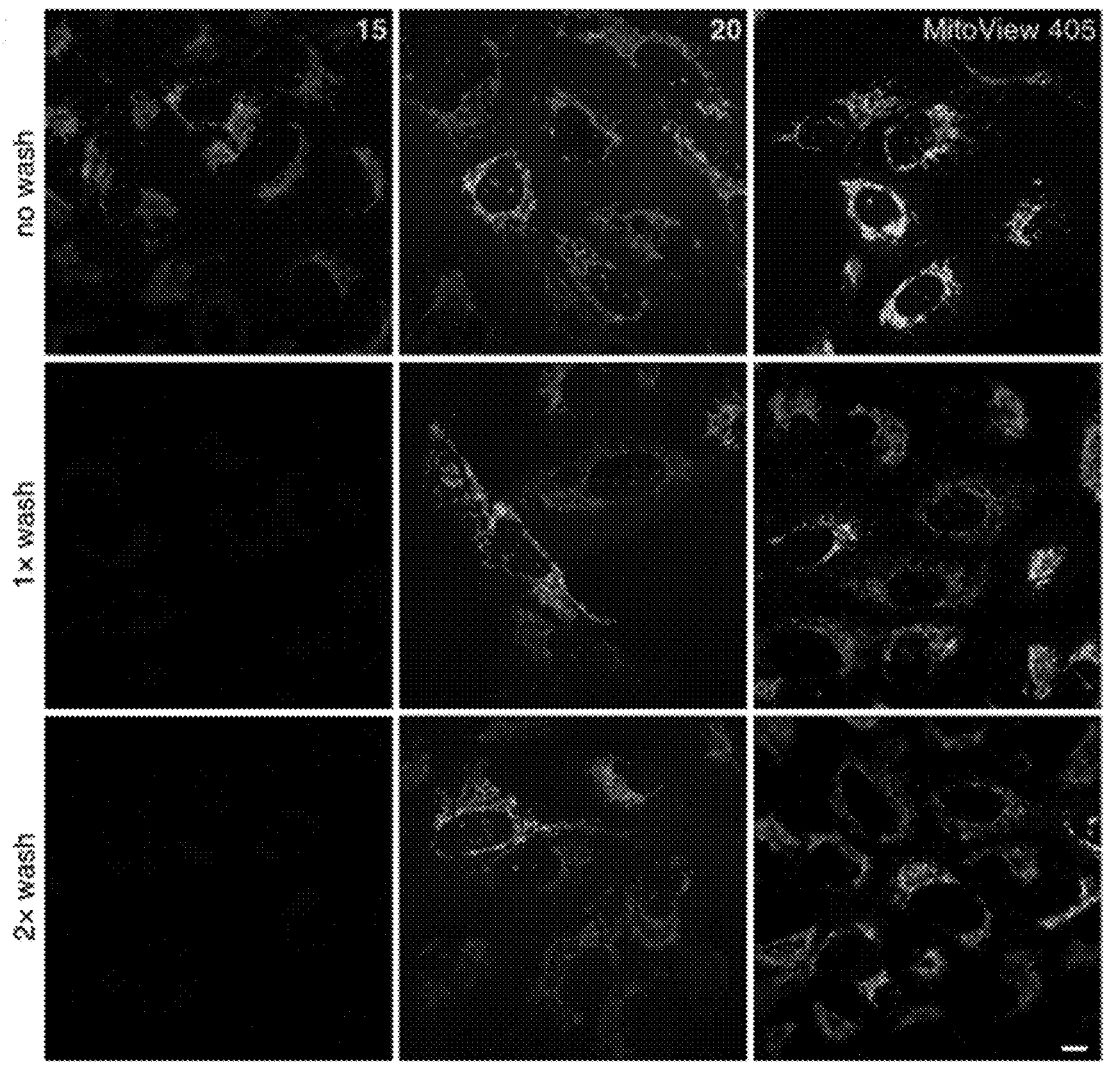

We then compared the parent DAB 15, diDAB 20, and the commercial violet-excited (and structurally mysterious) MitoView 405 in live-cell experiments. Although MitoView 405 was modestly brighter than DAB 15 or diDAB 20 upon initial application, the dye bleached rapidly in live cells in our hands, preventing acquisition of a full confocal microscopy stack. The DAB compounds exhibited substantially higher resistance to photobleaching with the diDAB 20 showing the best overall photostability (FIG. 9C). As expected, all the dyes showed excellent mitochondrial staining upon initial application (FIG. 9D). Upon media exchange, however, the DAB 15 signal rapidly decreased whereas the diDAB 20 and MitoView 405 were retained after this cell washing protocol.

In summary, as disclosed herein, the 2,7-diaminobenzopyrylium (DAB) framework is a modular scaffold for the synthesis of mitochondrial stains excited with violet light. These atom-efficient imaging reagents can be prepared from the broad palette of 7-aminocoumarin dyes with different N-substitution patterns (FIG. 1C-1E). Although the spectral properties can be tuned by choosing different coumarin starting materials, the structure of the secondary amine reactant has only minor effects on the properties of the resulting DAB dyes—use of azetidine or piperidine gave fluorophores with similar quantum yield and photostability (FIG. 2G). This is in contrast to rhodamine dyes, where azetidine or piperidine auxochromes can elicit 10-fold changes in $\Phi_f$.[18] The DAB dyes exhibit higher absorptivity and photostability than their coumarin parent dyes (FIG. 2A-2G), show reasonable chemical stability (FIG. 3A-3D), and are effective mitochondrial stains (FIG. 7); dimerization of the DAB dye affords a stain with better cellular retention (FIG. 9A-9D). Looking forward, the utility of these bright, photostable, and biocompatible "mini-rhodamines" (FIG. 1A-1B) could be expanded beyond mitochondrial stains. The stability of the iminium moiety could be improved through intramolecular cyclization to develop new conjugatable fluorescent labels or photolabile groups. The slow rate of hydrolysis could also be tuned and exploited to release coumarin-based drugs.[23] Overall, the DAB dyes represent an underutilized chemical scaffold worthy of further attention.

Spectroscopy and Imaging

Compound sources. Coumarins 6 (Coumarin 1) and 12 (Coumarin 102) were purchased from Exciton. Compound 10 was available from previous work.[18]

Buffers etc. All solutions were prepared using purified water from a Milli-Q Synthesis water purification system (Millipore). Phosphate-buffered saline (PBS), pH 7.4 was prepared from a 10× stock (Corning, 46-013-CM). Citrate buffer, pH 5 contained 10 mM citrate and 150 mM NaCl. Tris buffer, pH 9 was contained 10 mM tris(hydroxymethyl) aminomethane and 150 mM NaCl. To prepare sodium dodecyl sulfate (SDS) micelles, ultrapure SDS (J. T. Baker, 4095-04) was added directly to PBS at 1 mg/mL. Dioxane: water mixtures were prepared using anhydrous dioxane (Sigma-Aldrich, 296309). Dulbecco's Modified Eagle Medium (DMEM, phenol red-free) and fetal bovine serum (FBS) were obtained from Life Technologies.

UV-vis and fluorescence spectroscopy (FIG. 2A-C, 2G, FIG. 9B, FIG. 11A-11B). Fluorescent molecules for spectroscopy were prepared as stock solutions in DMSO and diluted such that the DMSO concentration did not exceed 1% v/v. Spectroscopy was performed using 1-cm path length, 3.5-mL quartz cuvettes from Starna Cells. All measurements were taken at ambient temperature (22±2° C.). Absorption spectra were recorded on a Cary Model 100 spectrometer (Agilent). Fluorescence spectra were recorded on a Cary Eclipse fluorometer (Varian). Unless otherwise noted, maximum absorption wavelength ($\lambda_{abs}$), extinction coefficient (ε), and maximum emission wavelength ($\lambda_{em}$)

were measured in PBS, pH 7.4. Reported values and spectra are averages (n=3). Normalized spectra are shown for clarity. For the Beer-Lambert-Bouguer analysis of DAB dyes 15 and 20, 100×DMSO stock solutions of dyes were prepared to ensure consistent [DMSO]=1% v/v; absorption was measured at the $\lambda_{abs}$ (n=3).

Quantum yield determination (FIG. 2G, FIG. 11B). All reported absolute fluorescence quantum yield values ($\Phi_f$) were measured under identical conditions using a Quantaurus-QY spectrometer (model C11374, Hamamatsu). Unless otherwise noted, $\Phi_f$ values were measured in PBS, pH 7.4. This instrument uses an integrating sphere to determine photons absorbed and emitted by a sample. Measurements were carried out using dilute samples (A<0.1) and self-absorption corrections[24] were performed using the instrument software. Reported values are averages (n=3).

Figure 2F:
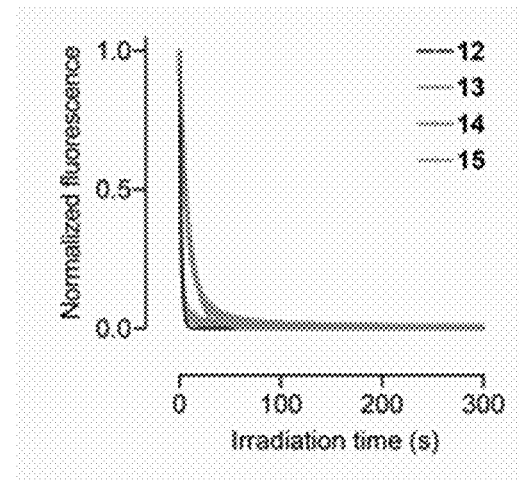

In vitro photobleaching measurements (FIG. 2D-F). Solutions of 8, 11, 13-15 (5 µM) were prepared in 10 mM HEPES, pH 7.3. An aliquot of these solutions was added to each well of 10-well Teflon printed glass slide with 1.5 mm well diameter (Tekdon, Inc.) and sealed with a coverslip using vacuum grease. The hydrophobic coating of the slide resulted in formation of macrodroplets of aqueous dye solution in each well. Fluorophore bleaching was measured by illuminating an entire droplet using an upright microscope (Zeiss Axio Observer Z2) and a 5×/0.25 NA objective. Light illumination was provided by a mercury lamp (X-Cite Series 120-Q) with two filter sets depending on dye type. For the coumarin dyes, the light was passed through an excitation filter centered at 390 nm with a 40 nm band-pass at 2.8 W/cm$^2$ intensity. For the DAB dyes, the light was passed through an excitation filter centered at 435 nm with a 40 nm band-pass at 4.55 W/cm$^2$ intensity. Fluorescence emission was collected through a 488 nm long-pass filter and detected with a fiber-coupled avalanche photodiode detector (SPQM-AQRH14; Pacer); n=3.

The obtained bleaching profiles were fit using a single exponential fitting function in MATLAB program to calculate their respective time constants ($t_b$). To allow a quantitative comparison of photobleaching for different fluorophores, the number of photons ($N_p$) emitted per molecule before photobleaching was calculated as previously described.[19] Briefly, the $N_p$ for each fluorophore was quantified from their respective excitation rate (W) and fluorescence quantum yield ($\Phi_f$). The excitation rate W (s$^{-1}$) was calculated by integrating the product of extinction coefficient ($\epsilon_\lambda$; in M$^{-1}$·cm$^{-1}$) and intensity ($I_\lambda$; in W·cm$^{-2}$) for the discrete wavelength ($\lambda$; in µm) as shown in Equation 1:

$$W=0.0192\Sigma\epsilon_\lambda \cdot I_\lambda \cdot \lambda \quad (1)$$

Photobleaching was characterized by calculating the number of photons ($N_p$) as the product of fluorescence quantum yield ($\Phi_f$), excitation rate (W) and photobleaching time constant ($t_b$) as shown in Equation 2:

$$N_p=\Phi_f \cdot W \cdot t_b \quad (2)$$

Measurement of chemical stability and photostability by tandem high-pressure liquid chromatography-mass spectrometry (LC-MS; FIG. 3A-D, FIG. 4A-4D, FIG. 6, FIG. 10). To examine the chemical stability and photostability of the DAB dyes, samples were assessed by tandem high-pressure liquid chromatography-mass spectrometry (LC-MS) using an Agilent 1200 LC-MS system equipped with an autosampler, diode array detector, and mass spectrometry detector (ESI; positive ion mode) using a 4.6×150 mm Gemini NX-C18 column with a 5-95% or 5-50% gradient of CH$_3$CN in H$_2$O containing constant 0.1% (v/v) TFA. Chromatograms were monitored using absorbance at 254 nm or 400 nm. To investigate chemical hydrolysis, solutions of 8, 11, and 13-15 (100 µM) were prepared in PBS, pH 7.4. An aliquot of this freshly prepared solution was immediately analyzed by LC-MS (t=0). The solution was then incubated at ambient temperature protected from light for 48 h and analyzed again by LC-MS (t=48 h). Standard samples of coumarins 6, 10, and 12 (100 µM, PBS) were analyzed in the same manner. To compare the stability of compounds 15 and 20 under different conditions, solutions of each dye (25 µM) in citrate buffer, pH 5, PBS, pH 7.4, or Tris buffer, pH 9 were prepared in an autosampler vial and the sample was analyzed using the LC-MS instrumentation every 30 min. The autosampler chamber in this LC-MS system is not temperature controlled and the higher rates of hydrolysis measured using this method reflect incubation of the solutions at higher-than-ambient temperature.

To investigate photochemistry, solutions of 8, 11, and 13-15 (100 µM) were prepared in PBS and placed in a glass vial. An aliquot of this freshly prepared solution was immediately analyzed by LC-MS (−hv). The solution was then irradiated with 405 nm light from an LED array (LOCTITE CL20 flood array) for 5 min (t=5 min) and 20 min (t=20 min) followed by analysis using LC-MS. Photochemical adducts 17/17i and 18/18i were purified and the spectral properties of these isomeric mixtures were analyzed. These compounds were then treated with 1 or 2 equivalents of NaOH(aq) to hydrolyze the iminium bond; the resulting oxidized coumarin products S1/S1i and S2/S2i were observed by LC-MS.

Measurement of chemical stability by fluorescence (FIG. 5A-5B). To compare the chemical stability of 15 in different conditions using changes in fluorescence, samples (1 µM) of 15 were prepared in the following solutions: citrate buffer, pH 5; PBS, pH 7.4; Tris buffer, pH 9; DMEM; and DMEM containing 10% v/v FBS (DMEM+FBS). 200 µL of each solution (n=3) was placed in a black, clear-bottom 96-well microplate (Nunc, 165305) and sealed with an adhesive film. The fluorescence of the DAB dye was monitored using 445 nm excitation and 510-550 nm emission (integrated signal) reading from the bottom of the plate using a TECAN Spark microplate reader controlled with SparkControl software.

Figure 7:
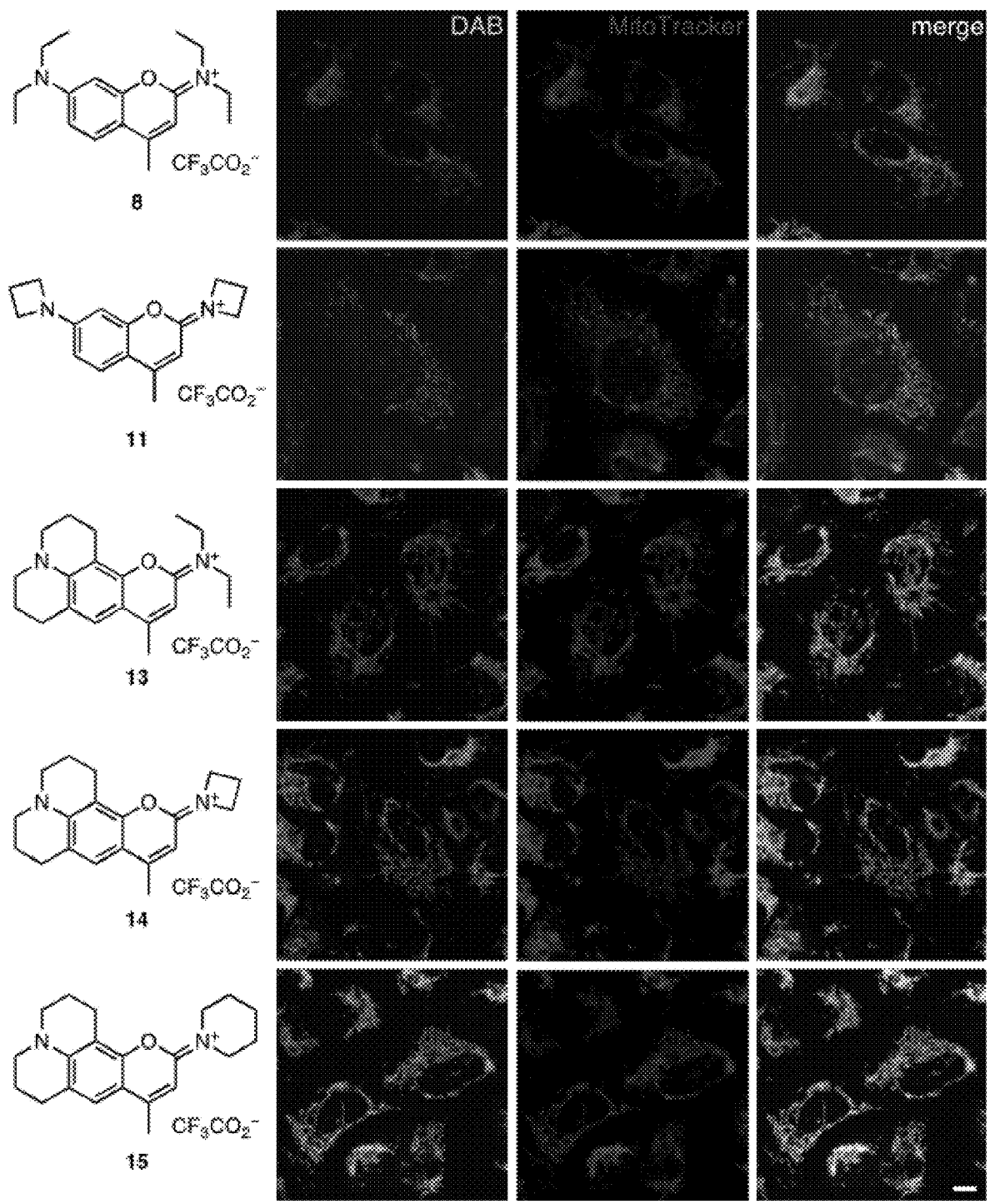
FIG. 7. DAB dyes stain mitochondria. Chemical structures of DAB dyes 8, 11, and 13-15 and corresponding fluorescence images of U2OS cells co-stained with the DAB dye (200 nM) and MitoTracker Deep Red (100 nM). Scale bar: 10 μm.
Figure 8:
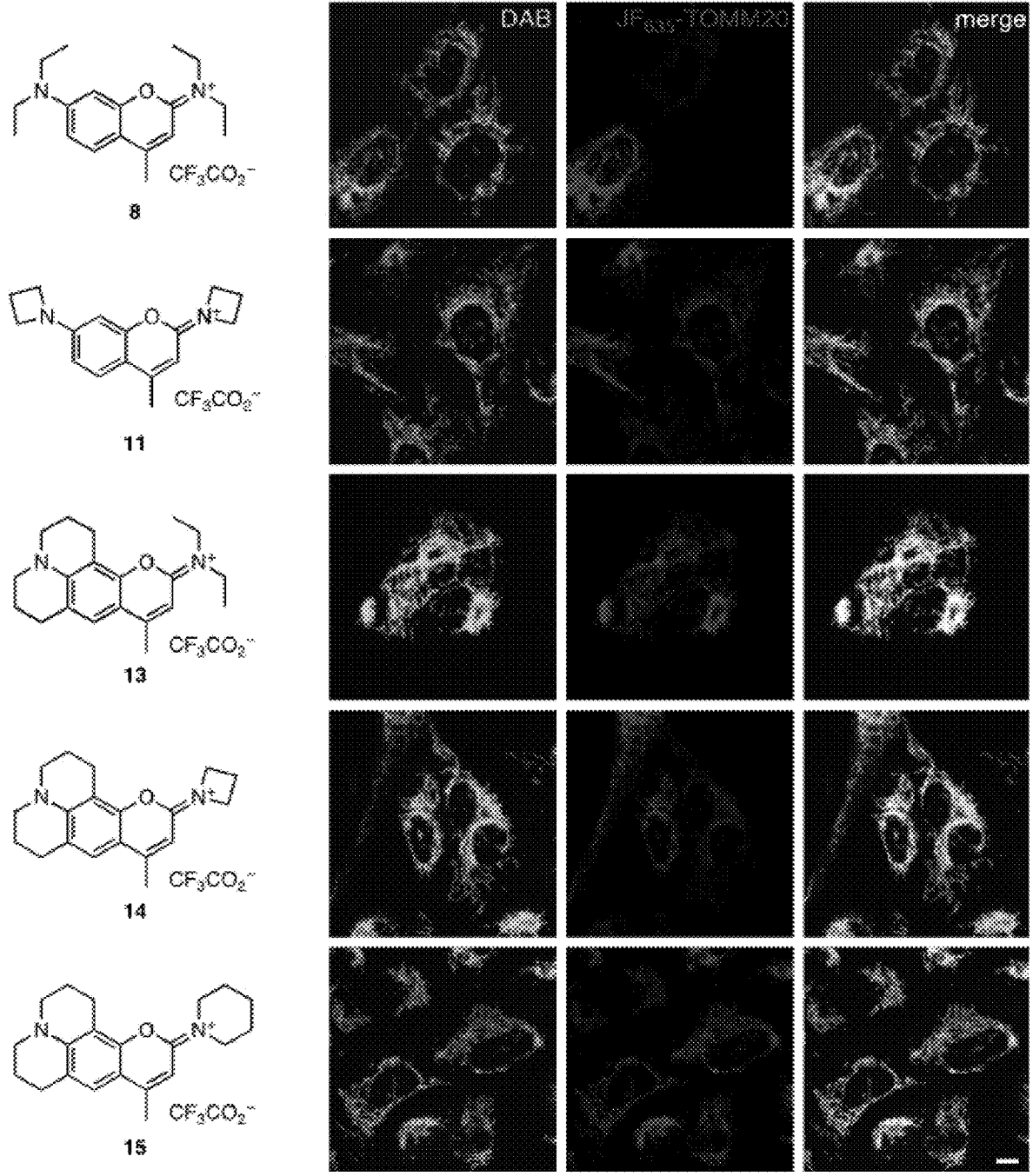
FIG. 8. DAB dyes are mitochondrial stains. Chemical structures of DAB dyes 8, 11, and 13-15 and corresponding fluorescence images of U2OS cells transiently transfected with a plasmid encoding TOMM20-HaloTag fusion protein and incubated with $JF_{635}$-HaloTag ligand (200 nM) together with each DAB dye (200 nM) for 1 h at 37° C. Scale bar: 10 μm. Note that the transient transfection of TOMM20-HaloTag results in a mixture of transfected and untransfected cells.

Cell culture and confocal fluorescence microscopy (FIG. 7, FIG. 9D, FIG. 8). U2OS cells (ATCC) were cultured in Dulbecco's modified Eagle medium (DMEM, phenol red-free; Life Technologies) supplemented with 10% v/v fetal bovine serum (FBS, Life Technologies), 1 mM GlutaMAX (Life Technologies) and maintained at 37° C. in a humidified 5% (v/v) CO$_2$ environment. This cell line undergoes regular mycoplasma testing by the Janelia Cell Culture Facility. Live-cell microscopic imaging was performed on a Zeiss LSM 800 or 880 confocal microscope with a Plan APO 63×/1.4 oil DIC M27 objective. For co-staining mitochondria using MitoTracker Deep Red, live U2OS cells were first incubated with MitoTracker Deep Red (100 nM; ThermoFisher) for 15 min at 37° C., washed 2× with dye-free media then incubated with DAB dyes 8, 11, 13-15 (200 nM) for 1 h at 37° C. and imaged live without washing. For co-staining mitochondria using TOMM20-HaloTag labeling, U2OS cells were transiently transfected with a plasmid expressing a TOMM20-HaloTag fusion protein by nucleofection (Lonza); TOMM20 is an outer mitochondrial membrane protein as part of a protein translocase complex. Cells were incubated with JF$_{635}$-HaloTag ligand (200 nM) together with each DAB dye (200 nM) for 1 h at 37° C. and imaged live without washing. The confocal image stacks were processed using FIJI[25] and displayed as maximum intensity image projections.

To compare cellular retention of 15, 20, and MitoView 405, U2OS cells were incubated with 15 (200 nM), 20 (200 nM) or MitoView 405 (100 nM; Biotium) for 1 h at 37° C. These samples were imaged live without washing, after 1× wash with dye-free media, or after 2× wash with dye-free media. The confocal images were processed using FIJI[4] and displayed as maximum intensity image projections.

In-cell photostability experiments (FIG. 9C). U2OS cells were incubated with 15 (200 nM), 20 (200 nM) or MitoView 405 (100 nM; Biotium) for 1 h at 37° C. and imaged live without washing using a Leica SP8 Falcon confocal microscope with enabled adaptive focus control (AFC), an HC PL-APO 86×/1.20 water objective, and a 405 nm diode laser at 58.9% laser power. Imaging was continued over 15 photobleaching cycles; n=3. These images were processed using FIJI.[25]

Statistics and Reproducibility. For spectroscopy measurements and photobleaching experiments, reported n values represent measurements of different samples prepared from the same dye DMSO stock solution. For cell-based photostability experiments, n represents different fields of view. For fluorescence microscopy imaging experiments, all procedures were repeated at least once on a separate biological sample to ensure results were similar.

Synthesis

General. Commercial reagents were obtained from reputable suppliers and used as received. All solvents were purchased in septum-sealed bottles stored under an inert atmosphere. Azetidinylcoumarin 10 was synthesized as previously described.[18] All reactions were sealed with septa through which an argon atmosphere was introduced unless otherwise noted. Reactions were conducted in round-bottomed flasks or septum-capped crimp-top vials containing Teflon-coated magnetic stir bars. Heating of reactions was accomplished with an aluminum reaction block on top of a stirring hotplate equipped with an electronic contact thermometer to maintain the indicated temperatures.

Reactions were monitored by thin layer chromatography (TLC) on precoated TLC glass plates (silica gel 60 $F_{254}$, 250 µm thickness) or by LC-MS (Phenomenex Kinetex 2.1 mm×30 mm 2.6 µm C18 column; 5 µL injection; 5-98% MeCN/$H_2O$, linear gradient, with constant 0.1% v/v $HCO_2H$ additive; 6 min run; 0.5 mL/min flow; ESI; positive ion mode). TLC chromatograms were visualized by UV illumination or developed with p-anisaldehyde, ceric ammonium molybdate, or $KMnO_4$ stain. Reaction products were purified by preparative HPLC (Phenomenex Gemini-NX 30×150 mm 5 µm C18 column). Tandem high-pressure liquid chromatography-mass spectrometry (LC-MS) was performed on an Agilent 1200 LC-MS system equipped with an autosampler, diode array detector, and mass spectrometry detector (ESI; positive ion mode) using a 4.6×150 mm Gemini NX-C18 column with a 5-95% or 5-50% gradient of $CH_3CN$ in $H_2O$ containing constant 0.1% (v/v) trifluoroacetic acid (TFA). High-resolution mass spectrometry was performed by the High Resolution Mass Spectrometry Facility at the University of Iowa.

NMR spectra were recorded on a 400 MHz spectrometer. $^1H$ and $^{13}C$ chemical shifts were referenced to TMS or residual solvent peaks. Data for $^1H$ NMR spectra are reported as follows: chemical shift (δ ppm), multiplicity (s=singlet, d=doublet, t=triplet, q=quartet, dd=doublet of doublets, m=multiplet), coupling constant (Hz), integration. Data for $^{13}C$ NMR spectra are reported by chemical shift (δ ppm) with hydrogen multiplicity (C, CH, $CH_2$, $CH_3$) information obtained from DEPT spectra. To determine the equivalents of TFA in the preparative HPLC-purified products, an internal fluorobenzene standard was added to 8, 11, 13-15, or 20 in $CDCl_3$ or $CD_3CN$. Integration of the $^1H$ NMR and $^{19}F$ NMR signals from the fluorobenzene and DAB dyes allowed calculation of TFA equivalents. 8, 11, and 13-15 were found to contain 4 equivalents of TFA per molecule and the dimer 20 contains 8 equivalents of TFA per molecule.

2,7-Bis(diethylamino)-4-methylbenzopyrylium trifluoroacetate (8): The following procedure for dye (8) is representative. To a solution of 7-diethylamino-4-methylcoumarin (Coumarin 1, 6; 1.0 g, 4.32 mmol) in 20 mL of anhydrous $CH_2Cl_2$ was added triethyloxonium tetrafluoroborate (4.32 mmol, 4.3 mL of a 1 M solution in $CH_2Cl_2$, 1 equiv). The reaction was stirred for 40 min at 30° C. after which diethylamine (2 mL, 20 mmol, 4.63 equiv) was added and the reaction heated to reflux for 2 h. The reaction was cooled to room temperature and the reaction was partitioned between water and $CH_2Cl_2$. The organic solution was separated and washed with water, saturated NaCl(aq), and dried over $MgSO_4$. This was filtered and concentrated under reduced pressure. The residue was dissolved in $CH_2Cl_2$ (6 mL) after which diethyl ether (30 mL) was added. The resulting precipitate was collected by filtration and partially purified by crystallization from hexane:acetone (1:1). This product was further purified by reverse-phase preparative HPLC using 5→95% v/v $CH_3CN$ in $H_2O$, linear gradient with a constant 0.1% v/v TFA additive. The product-containing fractions were lyophilized, affording the desired product 8 (710 mg, 41%) as yellow powder. $^1H$ NMR ($CDCl_3$, 400 MHz) δ7.60 (d, J=9.2 Hz, 1H), 6.81 (dd, J=9.2, 2.5 Hz, 1H), 6.62 (d, J=2.6 Hz, 1H) 6.54 (s, 1H), 3.83 (q, J=7.2 Hz, 2H), 3.75 (q, J=7.2 Hz, 2H), 3.50 (q, J=7.1 Hz, 4H), 2.58 (s, 3H), 1.43-3.50 (m, 6H), 1.26 (t, J=7.1 Hz, 6H). $^{13}C$ NMR ($CDCl_3$, 101 MHz) δ161.1 (C), 158.6 (C), 154.7 (C), 152.9 (C), 127.2 (CH), 112.1 (CH), 109.3 (C), 99.9 (CH), 96.4 (CH), 45.6 ($CH_2$), 45.2 ($CH_2$), 44.9 ($CH_2$), 19.4 ($CH_3$), 13.1 ($CH_3$), 12.7 ($CH_3$), 12.4 ($CH_3$). HRMS (ESI) calcd for $C_{18}H_{27}N_2O$ $[M]^+$ 287.2118, found 287.2114.

2,7-Di(azetidin-1-yl) 4-methylbenzopyrylium trifluoroacetate (11): This compound was prepared using azetidinylcoumarin[18] 10 and azetidine according to the general procedure described for compound 8. Method for reverse-phase HPLC: 5→95% v/v $CH_3CN$ in $H_2O$, linear gradient, with constant 0.1% v/v TFA additive. Yield: 24% as a pale yellow powder. $^1H$ NMR ($CDCl_3$, 400 MHz) δ7.54 (d, J=8.8 Hz, 1H), 6.44 (dd, J=8.9, 2.2 Hz, 1H), 6.29 (d, J=2.2 Hz, 1H), 6.24 (s, 1H), 4.65-4.54 (m, 4H), 4.11 (t, J=7.5 Hz, 4H), 2.67 (p, J=7.9 Hz, 2H), 2.55-2.45 (m, 5H). $^{13}C$ NMR ($CDCl_3$, 101 MHz) δ160.4 (C), 157.7 (C), 154.8 (C), 154.0 (C), 127.1 (CH), 110.4 (CH), 109.9 (C), 99.7 (CH), 95.7 (CH), 52.6 ($CH_2$), 52.1 ($CH_2$), 51.6 ($CH_2$), 19.3 ($CH_3$), 16.6 ($CH_2$), 16.4 ($CH_2$). HRMS (ESI) calcd for $C_{16}H_{19}N_2O$ $[M]^+$ 255.1492, found 255.1488.

N-ethyl-N-(9-methyl-2,3,6,7-tetrahydro-1H,5H,11H-pyrano[2,3-f]pyrido[3,2,1-ij]quinolin-11-ylidene) ethanaminium trifluoroacetate (13): This compound was prepared using Coumarin 102 (12) and diethylamine according to the general procedure described above for compound 8. Method for reverse-phase preparative HPLC: 5→95% v/v $CH_3CN$ in $H_2O$, linear gradient, with constant 0.1% v/v TFA additive. Yield: 43% as a yellow powder. $^1H$ NMR ($CDCl_3$, 400 MHz) δ7.19 (s, 1H), 6.40 (s, 1H), 3.78 (q, J=7.2 Hz, 2H), 3.71 (q, J=7.2 Hz, 2H), 3.41-3.34 (m, 4H), 2.86 (t, J=6.4 Hz, 2H), 2.82 (t, J=6.5 Hz, 2H), 2.54 (s, 3H), 2.08-

1.95 (m, 4H), 1.43-1.33 (m, 6H). $^{13}$C NMR (CDCl$_3$, 101 MHz) δ160.7 (C), 158.4 (C), 149.8 (C), 148.5 (C), 123.1 (CH), 121.9 (C), 109.2 (C), 105.5 (C), 99.0 (CH), 50.3 (CH$_2$), 49.6 (CH$_3$), 27.9 (CH$_3$), 20.9 (CH$_2$), 20.1 (CH$_2$), 20.01 (CH$_2$), 19.5 (CH$_3$). HRMS (ESI) calcd for C$_{20}$H$_{27}$N$_2$O [M]$^+$ 311.2118 found 311.2112.

1-(9-methyl-2,3,6,7-tetrahydro-1H,5H,11H-pyrano[2,3-f]pyrido[3,2,1-ij]quinolin-11-ylidene)azetidin-1-ium trifluoroacetate (14): This compound was prepared using Coumarin 102 (12) and azetidine according to the general procedure described above for compound 8. Method for reverse-phase preparative HPLC: 5→95% v/v CH$_3$CN in H$_2$O, linear gradient, with constant 0.1% v/v TFA additive. Yield: 10% as a yellow powder. $^1$H NMR (CDCl$_3$, 400 MHz) δ7.15 (s, 1H), 6.08 (s, 1H), 4.56 (t, J=7.8 Hz, 4H), 3.40-3.31 (m, 4H), 2.81 (t, J=6.3 Hz, 4H), 2.67 (p, J=7.8 Hz, 2H), 2.48 (s, 3H), 2.06-1.92 (m, 4H). $^{13}$C NMR (CDCl$_3$, 101 MHz) δ160.3 (C), 157.4 (C), 149.4 (C), 148.3 (C), 123.1 (CH), 121.5 (C), 109.1 (C), 105.9 (C), 98.0 (CH), 52.1 (CH$_2$), 51.4 (CH$_2$), 50.2 (CH$_2$), 49.7 (CH$_2$), 27.9 (CH$_2$), 21.0 (CH$_2$), 20.0 (CH$_2$), 19.9 (CH$_2$), 19.1 (CH$_3$), 16.6 (CH$_2$). HRMS (ESI) calcd for C$_{19}$H$_{23}$N$_2$O [M]$^+$ 295.1805 found 295.1801.

1-(9-methyl-2,3,6,7-tetrahydro-1H,5H,11H-pyrano[2,3-f]pyrido[3,2,1-ij]quinolin-11-ylidene)piperidin-1-ium trifluoroacetate (15): This compound was prepared using Coumarin 102 (12) and piperidine according to the general procedure described above for compound 8. Method for reverse-phase preparative HPLC: 5→95% v/v CH$_3$CN in H$_2$O, linear gradient, with constant 0.1% v/v TFA additive. Yield: 45% as a yellow powder. $^1$H NMR (CDCl$_3$, 400 MHz) δ7.16 (s, 1H), 6.51 (s, 1H), 4.01-3.67 (m, 4H), 3.45-3.29 (m, 4H), 2.87-2.76 (m, 4H), 2.51 (s, 3H), 2.09-1.89 (m, 4H), 1.86-1.73 (m, 6H). $^{13}$C NMR (CDCl$_3$, 101 MHz) δ159.8 (C), 158.4 (C), 149.5 (C), 148.6 (C), 122.9 (CH), 121.9 (C), 109.0 (C), 105.5 (C), 98.7 (CH), 50.2 (CH$_2$), 49.6 (CH$_2$), 27.8 (CH$_2$), 25.7 (CH$_2$), 23.5 (CH$_2$), 20.9 (CH$_2$), 20.3 (CH$_2$), 19.9 (CH$_2$), 19.4 (CH$_3$). HRMS (ESI) calcd for C$_{21}$H$_{27}$N$_2$O [M]$^+$ 323.2118 found 323.2111.

4,4'-(propane-1,3-diyl)bis(1-(9-methyl-2,3,6,7-tetrahydro-1H,5H,11H-pyrano[2,3-f]pyrido[3,2,1-ij]quinolin-11-ylidene)piperidin-1-ium) trifluoroacetate (20): To a solution of Coumarin 102 (12; 255 mg, 1.0 mmol, 10 equiv) in 20 mL of anhydrous CH$_2$Cl$_2$ was added triethyloxonium tetrafluoroborate (1.0 mmol, 1.0 mL of 1 M in CH$_2$Cl$_2$, 10 equiv). The reaction was stirred for 40 min at 30° C., after which 4,4'-trimethylenedipiperidine (16, 21 mg, 0.1 mmol, 1 equiv) was added and the reaction was heated to reflux for 48 h. The reaction was cooled to room temperature and the reaction was partitioned between water and CH$_2$Cl$_2$. The organic solution was separated and washed with water, saturated NaCl(aq), and dried over MgSO$_4$. This was filtered and concentrated under reduced pressure. The resulting precipitate was collected by filtration and partially purified by crystallization from hexane:acetone (1:1). This product was further purified by reverse-phase preparative HPLC using 5→90% v/v CH$_3$CN in H$_2$O, linear gradient with a constant 0.1% v/v TFA additive. The product-containing fractions were lyophilized, affording the desired product 20 (6 mg, 7%) as yellow powder. $^1$H NMR (CDCl$_3$, 400 MHz) δ7.15 (s, 2H), 6.59 (s, 2H), 4.68-4.52 (m, 2H), 4.38-4.20 (m, 2H), 3.45-3.21 (m, 12H), 2.91-2.76 (m, 8H), 2.52 (s, 6H), 2.10-1.91 (m, 12H), 1.81-1.66 (m, 2H). 1.43-1.25 (m, 10H). $^{13}$C NMR (CDCl$_3$, 101 MHz) δ159.8 (C), 158.3 (C), 149.5 (C), 148.5 (C), 122.9 (CH), 121.8 (C), 109.1 (C), 105.7 (C), 99.1 (CH), 50.3 (CH$_2$), 49.7 (CH$_2$), 47.7 (CH$_2$), 46.0 (CH$_2$), 35.5 (CH$_2$), 34.8 (CH), 31.8 (CH$_2$), 27.9 (CH$_2$), 23.1 (CH$_2$), 21.0 (CH$_2$), 20.3 (CH$_2$), 20.0 (CH$_2$), 19.5 (CH$_3$) HRMS (ESI) calcd for C$_{45}$H$_{58}$N$_4$O$_2$ [M]$^{2+}$ 343.2274 found 343.2275.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. Crivat, G.; Taraska, J. W., Imaging proteins inside cells with fluorescent tags. Trends Biotechnol. 2012, 30, 8-16.
2. Bruchez, M. P., Dark dyes—bright complexes: Fluorogenic protein labeling. Curr. Opin. Chem. Biol. 2015, 27, 18-23.
3. Lavis, L. D., Chemistry is dead. Long live chemistry! Biochemistry 2017, 56, 5165-5170.
4. Erdmann, R. S.; Baguley, S. W.; Richens, J. H.; Wissner, R. F.; Xi, Z.; Allgeyer, E. S.; Zhong, S.; Thompson, A. D.; Lowe, N.; Butler, R.; Bewersdorf, J.; Rothman, J. E.; St Johnston, D.; Schepartz, A.; Toomre, D., Labeling strategies matter for super-resolution microscopy: A comparison between HaloTags and SNAP-tags. Cell Chem. Biol. 2019, 26, 584-592.e6.
5. Grimm, J. B.; Lavis, L. D., Caveat fluorophore: An insiders' guide to small-molecule fluorescent labels. Nat. Methods 2022, doi: 10.1038/s41592-021-01338-6.
6. Valm, A. M.; Cohen, S.; Legant, W. R.; Melunis, J.; Hershberg, U.; Wait, E.; Cohen, A. R.; Davidson, M. W.; Betzig, E.; Lippincott-Schwartz, J., Applying systems-level spectral imaging and analysis to reveal the organelle interactome. Nature 2017, 546, 162-167.
7. Haugland, R. P.; Spence, M. T. Z.; Johnson, I. D.; Basey, A., The handbook: A guide to fluorescent probes and labeling technologies, 10th ed. Molecular Probes: Eugene, OR, 2005.
8. Dolman, N. J.; Kilgore, J. A.; Davidson, M. W., A review of reagents for fluorescence microscopy of cellular compartments and structures, Part I: BacMam labeling and reagents for vesicular structures. Curr. Protoc. Cytom. 2013, Chapter 12, Unit 12 30.
9. Foster, T. P., Probes for fluorescent visualization of specific cellular organelles. In Immunohistochemistry and Immunocytochemistry: Methods and Protocols, Del Valle, L., Ed. Springer US: New York, NY, 2022; pp 85-124.
10. Pierzynska-Mach, A.; Janowski, P. A.; Dobrucki, J. W., Evaluation of acridine orange, LysoTracker Red, and quinacrine as fluorescent probes for long-term tracking of acidic vesicles. Cytometry A 2014, 85, 729-737.
11. Greenspan, P.; Mayer, E. P.; Fowler, S. D., Nile Red: A selective fluorescent stain for intracellular lipid droplets. J. Cell Biol. 1985, 100, 965-973.
12. Johnson, L. V.; Walsh, M. L.; Chen, L. B., Localization of mitochondria in living cells with rhodamine 123. Proc. Natl. Acad. Sci. U.S.A. 1980, 77, 990-994.
13. Scaduto, R. C., Jr.; Grotyohann, L. W., Measurement of mitochondrial membrane potential using fluorescent rhodamine derivatives. Biophys. J. 1999, 76, 469-477.
14. Haugland, R. P.; Johnson, I. D., Detecting enzymes in living cells using fluorogenic substrates. J. Fluoresc. 1993, 3, 119-127.
15. Huang, S.-T.; Jian, J.-L.; Peng, H.-Z.; Wang, K.-L.; Lin, C.-M.; Huang, C.-H.; Yang, T. C. K., The synthesis and optical characterization of novel iminocoumarin derivatives. Dyes Pigm. 2010, 86, 6-14.
16. Liepouri, F.; Foukaraki, E.; Deligeorgiev, T. G.; Katerinopoulos, H. E., Iminocoumarin-based low affinity fluorescent Ca2+ indicators excited with visible light. Cell Calcium 2001, 30, 331-335.
17. M. A. Kirpicheok, M. A.; Gorozhankin, S. K.; D. S. Yufit, D. S.; Struchkov, Y. T.; Kurapov, P. B.; Grandberg, I. I., Synthesis and spectral-luminescent properties of 2,7-diaminobenzopyrylium tetrafluoroborates. Khim. Geterotsikl. Soedin. 1989, 6, 755-766.
18. Grimm, J. B.; English, B. P.; Chen, J.; Slaughter, J. P.; Zhang, Z.; Revyakin, A.; Patel, R.; Macklin, J. J.; Normanno, D.; Singer, R. H.; Lionnet, T.; Lavis, L. D., A general method to improve fluorophores for live-cell and single-molecule microscopy. Nat. Methods 2015, 12, 244-250.
19. Abdelfattah, A. S.; Kawashima, T.; Singh, A.; Novak, O.; Liu, H.; Shuai, Y.; Huang, Y. C.; Campagnola, L.; Seeman, S. C.; Yu, J.; Zheng, J.; Grimm, J. B.; Patel, R.; Friedrich, J.; Mensh, B. D.; Paninski, L.; Macklin, J. J.; Murphy, G. J.; Podgorski, K.; Lin, B. J.; Chen, T. W.; Turner, G. C.; Liu, Z.; Koyama, M.; Svoboda, K.; Ahrens, M. B.; Lavis, L. D.; Schreiter, E. R., Bright and photostable chemigenetic indicators for extended in vivo voltage imaging. Science 2019, 365, 699-704.
20. Kuznetsova, N. y. A.; Kaliya, O. L., The photochemistry of coumarins. Russ. Chem. Rev. 1992, 61, 683-696.
21. Zheng, Q.; Lavis, L. D., Development of photostable fluorophores for molecular imaging. Curr. Opin. Chem. Biol. 2017, 39, 32-38.
22. Grimm, J. B.; Muthusamy, A. K.; Liang, Y.; Brown, T. A.; Lemon, W. C.; Patel, R.; Lu, R.; Macklin, J. J.; Keller, P. J.; Ji, N.; Lavis, L. D., A general method to fine-tune fluorophores for live-cell and in vivo imaging. Nat. Methods 2017, 14, 987-994.
23. Stefanachi, A.; Leonetti, F.; Pisani, L.; Catto, M.; Carotti, A., Coumarin: A natural, privileged and versatile scaffold for bioactive compounds. Molecules 2018, 23, 250.
24. Suzuki, K.; Kobayashi, A.; Kaneko, S.; Takehira, K.; Yoshihara, T.; Ishida, H.; Shiina, Y.; Oishi, S.; Tobita, S., Reevaluation of absolute luminescence quantum yields of standard solutions using a spectrometer with an integrating sphere and a back-thinned CCD detector. Phys. Chem. Chem. Phys. 2009, 11 (42), 9850-9860.
25. Schindelin, J.; Arganda-Carreras, I.; Frise, E.; Kaynig, V.; Longair, M.; Pietzsch, T.; Preibisch, S.; Rueden, C.; Saalfeld, S.; Schmid, B.; Tinevez, J. Y.; White, D. J.; Hartenstein, V.; Eliceiri, K.; Tomancak, P.; Cardona, A., Fiji: An open-source platform for biological-image analysis. Nat. Methods 2012, 9 (7), 676-682.

It will be understood that various details of the presently disclosed subject matter can be changed without departing from the scope of the subject matter disclosed herein. Furthermore, the foregoing description is for the purpose of illustration only, and not for the purpose of limitation.

What is claimed is:
1. A compound of the formula:

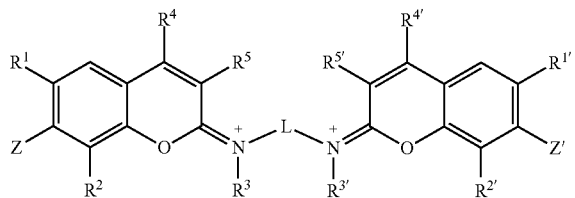

wherein
L is selected from the group consisting of alkyl, substituted alkyl, and —(CH$_2$CH$_2$O)$_n$CH$_2$CH$_2$—, wherein n is from 1 to 4;
Z and Z' are selected from the group consisting of O(alkyl) and N(alkyl)$_2$;
R$^1$ and R$^{1'}$ are selected from the group consisting of halogen, H, D, alkyl, and substituted alkyl; or R$^1$ and Z, and R$^{1'}$ and Z', taken together with the carbon atoms to which they are bonded, form a substituted or unsubstituted ring containing 5, 6, 7, 8, or 9 atoms;
R$^2$ and R$^{2'}$ are selected from the group consisting of halogen, H, D, alkyl, and substituted alkyl; or R$^2$ and Z, and R$^{2'}$ and Z', taken together with the carbon atoms to which they are bonded, form a substituted or unsubstituted ring containing 5, 6, 7, 8, or 9 atoms;
R$^3$ and R$^{3'}$ are selected from the group consisting of alkyl and substituted alkyl; or R$^3$, taken together with the nitrogen atoms to which it is bonded, and R$^{3'}$, taken together with the nitrogen atoms to which it is bonded, form substituted or unsubstituted rings containing 4, 5, 6, 7, 8, or 9 atoms, wherein L is disposed between the ring of R$^3$ and the ring of R$^{3'}$;
R$^4$ and R$^{4'}$ are selected from the group consisting of H, halogen, CH$_3$, CF$_3$, CN, COO(alkyl), COO(aryl), alkyl, substituted alkyl, aryl, substituted aryl, alkenyl, and substituted alkenyl; and R$^5$ and R$^{5'}$ are selected from the group consisting of H, halogen, CH$_3$, CF$_3$, CN, COO(alkyl), COO(aryl), alkyl, substituted alkyl, aryl, substituted aryl, alkenyl, and substituted alkenyl; or R$^4$ and R$^5$, and R$^{4'}$ and R$^{5'}$, taken together with the carbon atoms to which they are bonded, form substituted or unsubstituted rings containing 5, 6, 7, 8, or 9 carbon atoms.

2. The compound of claim 1 selected from the group consisting of:

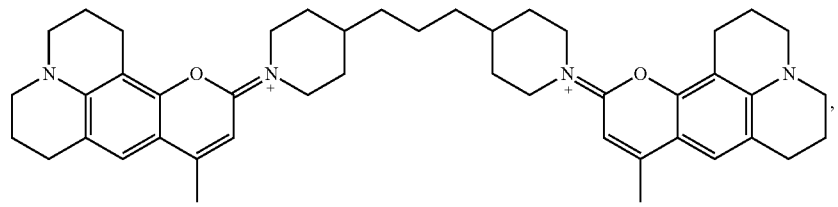

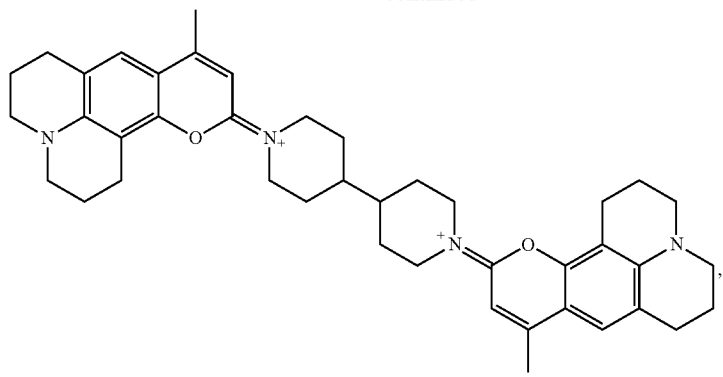
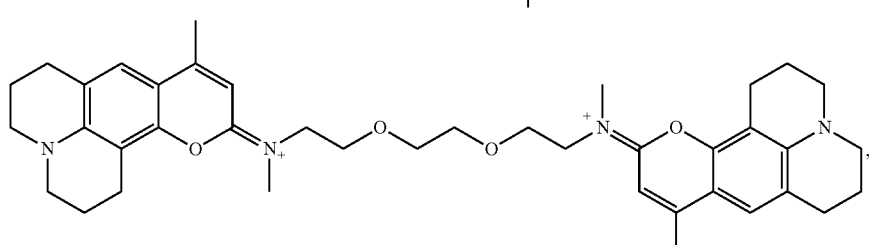
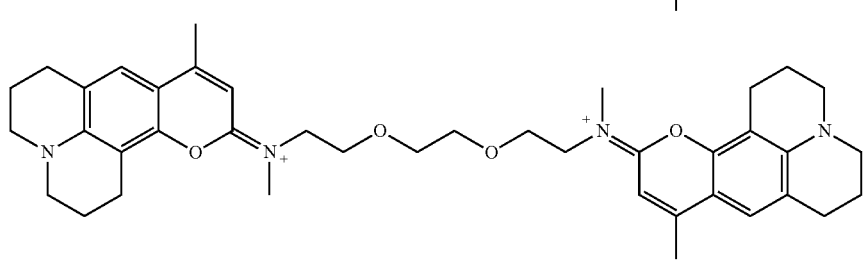
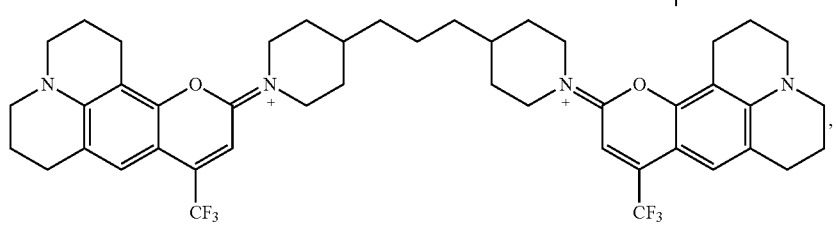
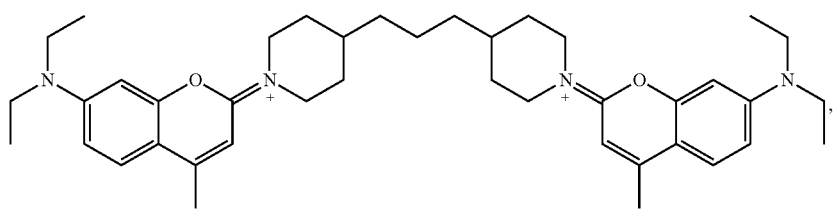
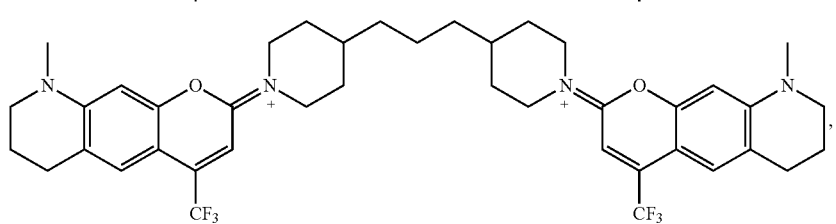
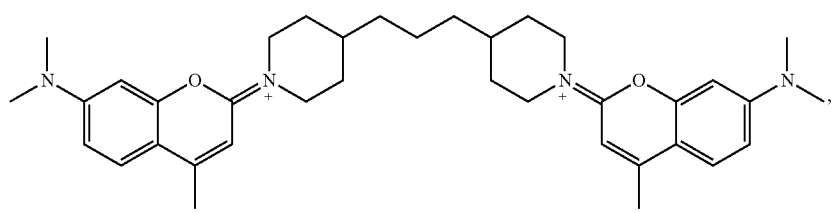

-continued
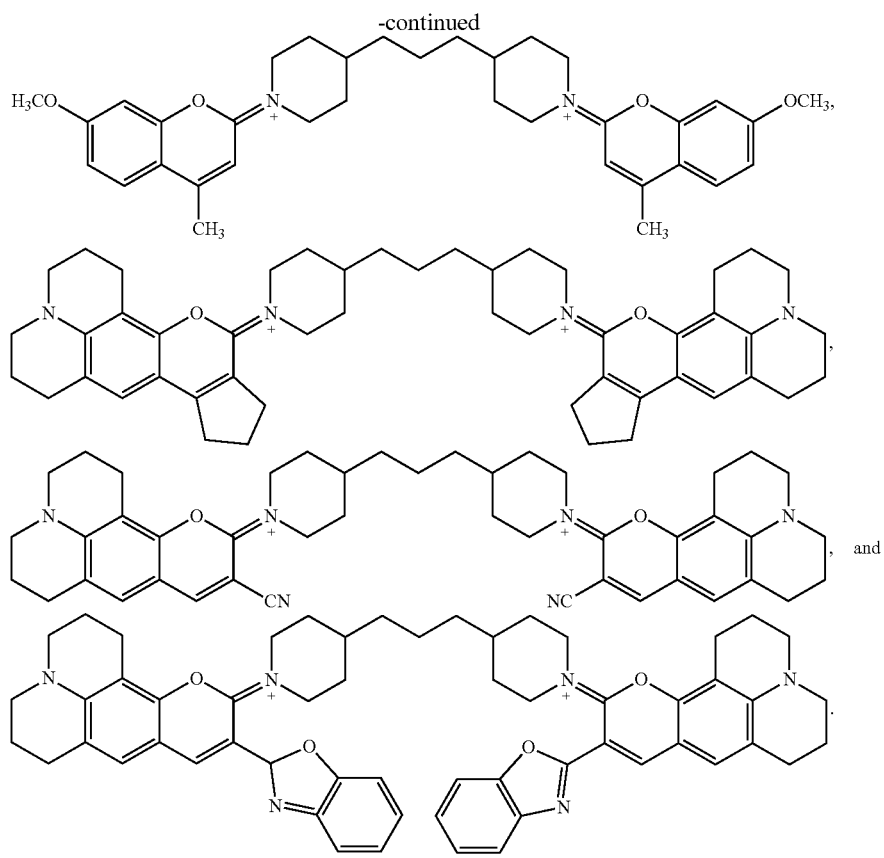
3. A method of imaging a sample comprising a cell, comprising:
   contacting the sample with a compound according to claim 1;
   exposing the sample to light; and
   detecting an emission, thereby allowing the sample to be imaged.
* * * * *